United States Patent
Nixon et al.

(10) Patent No.: US 7,783,370 B2
(45) Date of Patent: Aug. 24, 2010

(54) SYSTEM FOR CONFIGURING GRAPHIC DISPLAY ELEMENTS AND PROCESS MODULES IN PROCESS PLANTS

(75) Inventors: Mark J. Nixon, Round Rock, TX (US); Arthur Webb, Manila (PH); J. Michael Lucas, Leicester (GB); Ken J. Beoughter, Round Rock, TX (US); Terrence L. Blevins, Round Rock, TX (US); Stephen Gilbert, Austin, TX (US); Bruce Campney, Manor, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 265 days.

(21) Appl. No.: 10/575,022
(22) PCT Filed: May 4, 2005
(86) PCT No.: PCT/US2005/015391
§ 371 (c)(1),
(2), (4) Date: Jan. 29, 2007
(87) PCT Pub. No.: WO2005/109123
PCT Pub. Date: Nov. 17, 2005

(65) Prior Publication Data
US 2007/0168065 A1    Jul. 19, 2007

Related U.S. Application Data
(60) Provisional application No. 60/567,980, filed on May 4, 2004.

(51) Int. Cl.
*G05B 9/02* (2006.01)
(52) U.S. Cl. .............................. 700/83; 700/17; 700/65; 700/96; 700/282; 703/3; 703/7; 703/9; 714/46; 714/47
(58) Field of Classification Search .................. 700/17, 700/19–21, 65, 83, 96, 113, 177, 282; 703/3, 703/7, 9; 702/188; 714/46–47; 715/747
See application file for complete search history.

(56) References Cited

U.S. PATENT DOCUMENTS 5,168,441 A    12/1992    Onarheim et al.

(Continued)

FOREIGN PATENT DOCUMENTS

EP    0813129    12/1997

(Continued)

OTHER PUBLICATIONS

Office Action for corresponding Chinese Application No. 200580014526.4, dated Jul. 4, 2008.

(Continued)

*Primary Examiner*—Albert DeCady
*Assistant Examiner*—Douglas S Lee
(74) *Attorney, Agent, or Firm*—Marshall, Gerstein & Borun LLP

(57) ABSTRACT

A system for facilitating configuration of a process plant may include a process graphics editor and a process module editor. The process graphics editor may facilitate creation and/or modification of a graphical representation of physical entities in the process plant. The process module editor may facilitate creation and/or modification of a process module. A process module may include one or more interconnected process objects representative of one or more corresponding physical entities in the process plant. The system may also include a supervisor module communicatively coupled to the process graphics editor and the process module editor. The supervisor module may be capable of detecting changes made to the graphical representation of the physical entities using the process graphics editor. In response to detecting such changes, the supervisor module may instruct the process module editor to make a corresponding change, if any, to a process module.

26 Claims, 23 Drawing Sheets

U.S. PATENT DOCUMENTS

| | | | |
|---|---|---|---|
| 5,611,059 A | 3/1997 | Benton et al. | |
| 5,631,825 A | 5/1997 | van Weele et al. | |
| 5,680,409 A | 10/1997 | Qin et al. | |
| 5,706,455 A | 1/1998 | Benton et al. | |
| 5,782,330 A * | 7/1998 | Mehlert et al. | 198/324 |
| 5,841,654 A | 11/1998 | Verissimo et al. | |
| 5,926,177 A | 7/1999 | Hatanaka et al. | |
| 6,173,208 B1 | 1/2001 | Park et al. | |
| 6,362,839 B1 | 3/2002 | Hamilton et al. | |
| 6,385,496 B1 | 5/2002 | Irwin et al. | |
| 6,396,516 B1 | 5/2002 | Beatty | |
| 6,445,963 B1 | 9/2002 | Blevins et al. | |
| 6,571,133 B1 | 5/2003 | Mandl et al. | |
| 6,587,108 B1 | 7/2003 | Guerlain et al. | |
| 6,618,630 B1 | 9/2003 | Jundt et al. | |
| 6,633,782 B1 | 10/2003 | Schleiss et al. | |
| 6,646,545 B2 * | 11/2003 | Bligh | 340/286.05 |
| 6,691,280 B1 | 2/2004 | Dove et al. | |
| 7,404,476 B2 * | 7/2008 | Yoshida | 198/324 |
| 2002/0019672 A1 | 2/2002 | Paunonen | |
| 2002/0022894 A1 | 2/2002 | Eryurek et al. | |
| 2002/0022895 A1 | 2/2002 | Genise et al. | |
| 2002/0055790 A1 | 5/2002 | Havekost | |
| 2002/0077711 A1 | 6/2002 | Nixon et al. | |
| 2002/0193888 A1 | 12/2002 | Wewalaarachchi et al. | |
| 2003/0014500 A1 | 1/2003 | Schleiss et al. | |
| 2003/0028269 A1 | 2/2003 | Spriggs et al. | |
| 2003/0153988 A1 | 8/2003 | Shepard et al. | |
| 2003/0191803 A1 | 10/2003 | Chinnici et al. | |
| 2003/0236576 A1 | 12/2003 | Resnick et al. | |
| 2004/0075689 A1 | 4/2004 | Schleiss et al. | |
| 2004/0153804 A1 | 8/2004 | Blevins et al. | |
| 2004/0199925 A1 | 10/2004 | Nixon et al. | |
| 2005/0197803 A1 | 9/2005 | Eryurek et al. | |
| 2005/0197805 A1 | 9/2005 | Eryurek et al. | |
| 2005/0197806 A1 | 9/2005 | Eryurek et al. | |
| 2005/0217971 A1 * | 10/2005 | Kim | 198/338 |
| 2007/0170037 A1 * | 7/2007 | Kuroda | 198/322 |
| 2008/0116035 A1 * | 5/2008 | Ogimura | 198/323 |

FOREIGN PATENT DOCUMENTS

| | | |
|---|---|---|
| EP | 1122652 | 8/2001 |
| GB | 2349958 | 11/2000 |
| GB | 2372365 | 8/2002 |
| WO | WO-95/04314 | 2/1995 |
| WO | WO 02/071169 | 9/2002 |
| WO | WO 03/075206 | 9/2003 |
| WO | WO 2005/107409 | 11/2005 |
| WO | WO-2005/107410 | 11/2005 |
| WO | WO 2005/107416 | 11/2005 |
| WO | WO 2005/109122 | 11/2005 |
| WO | WO 2005/109123 | 11/2005 |
| WO | WO 2005/109124 | 11/2005 |
| WO | WO 2005/109125 | 11/2005 |
| WO | WO 2005/109126 | 11/2005 |
| WO | WO 2005/109128 | 11/2005 |
| WO | WO 2005/109129 | 11/2005 |
| WO | WO 2005/109130 | 11/2005 |
| WO | WO-2005/109131 | 11/2005 |
| WO | WO 2005/109250 | 11/2005 |

OTHER PUBLICATIONS

CAMO product datasheet, "The Unscrambler 9.6," www.camo.com.

Developers.sun.com, "Core J2EE Patterns—Data Access Object," *CORE J2EE Pattern Catalog* (2004). Retrieved from the Internet on Feb. 01, 2006: <URL: http://web.archive.org/web/20040414043406/java.sun.com/blueprints/corej2eepatterns/Patterns/DataAccessObjects.html>.

Han et al., "Web Based rSPC (realtime Statistical Process Control) System Supporting XML Protocol," *ISIE*, vol. 1, pp. 399-403 (2001).

Mehta et at., "Feedfoward Neural Networks for Process Identification and Prediction," Neural Network and Experty Systems Presentation (2001).

Mohr et al., "BizTalk and Application Integration—Translating Between Message Specification: BizTalk Mapper," *Professional BizTalk*, pp. 1-3 (2001).

StatSoft product datasheet, "Statistica, Multivariate Statistical Process Control," www.statsoft.com.

Tzovla et at., "Abnormal Condition Management Using Expert Systems," Neural Network and Expert Systems Presentation (2001).

Umetrics product datasheet, "SIMCA-P 11" and "SIMCA-P+ 11," www.umetrics.com.

W3C, "XSL Transformations (XSLT)," *W3C Recommendation*, pp. 3 (1999).

European Office Action for Application No. 05747006.4-2206, dated Jul. 31, 2007.

International Search Report for International Application No. PCT/US2005/015390, mailed Sep. 16, 2005.

International Preliminary Examination Report issued in corresponding international application No. PCT/US2005/015391 dated Nov. 7, 2006.

Office Action issued in corresponding application No. GB0621083.5 dated Dec. 24, 2007.

Office Action issued in corresponding application No. CN 200580014526.4 dated Aug. 28, 2009.

* cited by examiner

SYSTEM FOR CONFIGURING GRAPHIC DISPLAY ELEMENTS AND PROCESS MODULES IN PROCESS PLANTS

RELATED APPLICATIONS

This application is a regular filed application of and claims, for the purposes of priority, the benefit of U.S. Provisional Application Ser. No. 60/567,980, entitled "Graphical User Interface for Representing, Monitoring, and Interacting with Process Control Systems," which was filed on May 4, 2004 and which this application hereby expressly incorporates by reference herein in its entirety. This application is also related to U.S. patent application Ser. No. 10/625,481, entitled "Integration of Graphic Display Elements, Process Modules and Control Modules in Process Plants," which was filed on Jul. 21, 2003, and which published as U.S. Publication No. 2004/0153804 on Aug. 5, 2004, which, in turn, is a Continuation-in-Part of U.S. patent application Ser. No. 10/278,469, entitled "Smart Process Modules and Objects in Process Plants," which was filed on Oct. 22, 2002, and which published as U.S. Publication No. 2004/0075689 on Apr. 22, 2004, the entire disclosures of which are hereby expressly incorporated by reference herein in their entirety. This application is also related to U.S. patent application Ser. No. 10/368,151 entitled "Module Class Objects in a Process Plant Configuration System," which was filed on Feb. 18, 2003, and which published as U.S. Publication No. 2004/0199925 on Oct. 7, 2004, the entire disclosure of which is hereby expressly incorporated by reference herein in its entirety. This application is also related to the following patent applications, which are being filed as International (PCT) applications on the same date as this application and which this application hereby expressly incorporates by reference herein in their entirety: "Associated Graphic Displays in a Process Environment" Ser. No. 10,589,712; "User Configurable Alarms and Alarm Trending for Process Control Systems" Ser. No. 10/574,570; "Integration of Process Modules and Expert Systems in Process Plants" Ser. No. 10/590,573; "A Process Plant User Interface System Having Customized Process Graphic Display Layers in an Integrated Environment" Ser. No. 10/574,824; "Scripted Graphics in a Process Environment" Ser No. 10/589,845; "Graphics Integration into a Process Configuration and Control Environment" Ser. No. 10/591,804; "Graphic Element with Multiple Visualizations in a Process Environment" Ser. No. 10/590,574; "Graphic Display Configuration Framework for Unified Process Control System Interface" Ser. No. 10/575,173; "Markup Language-Based, Dynamic Process Graphics in a Process Plant User Interface" Ser. No. 10/590,550; "Methods and Apparatus for Modifying Process Control Data" PCT/USOS/155596 and Ser. No. 11/556,612; "Methods and Apparatus for Accessing Process Control Data" (PCT/US05/15585 and Ser. No. 11/556,445); "Integrated Graphical Runtime Interface for Process Control Systems" (PCT/US05/15439 and Ser. No. 11/556,347); "Service-Oriented Architecture for Process Control Systems" (PCT/US05/15394 and Ser. No. 11/556, 554).

TECHNICAL FIELD

The present invention relates generally to process plants and, more particularly, to an intelligent control and simulation environment that enables user viewing, simulation and control to be integrated at the system level of the process plant control architecture.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol, which perform functions within the control scheme based on inputs thereto and which provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide preconfigured displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally preconfigured to display, in known manners, information or data received from the process control modules or the devices within the process plant. In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc. While the information needed for the displays is sent from the devices or configuration database within the process plant, that information is used only to provide a display to the user containing that information. As a result, all information and programming that is used to generate alarms, detect problems within the plant, etc. must be generated by and configured within the different devices associated with the plant, such as controllers and field devices during configuration of the process plant control system. Only then is this information sent to the operator display for display during process operation.

While error detection and other programming is useful for detecting conditions, errors, alarms, etc. associated with control loops running on the different controllers and problems within the individual devices, it is difficult to program the process control system to recognize system-level conditions or errors that must be detected by analyzing data from different, possible diversely located devices within the process plant. Still further, operator displays have typically not been used to indicate or present such system-level condition information to operators or maintenance personnel and, in any event, it is difficult to animate objects within operator displays with these alternate sources of information or data for the different elements within the display. This fact is particularly true with respect to the animation and modeling of streams of material, such as the flow of fluid in pipes, the movement of raw materials on conveyor belts, etc. which are typically indicated by a simple line connected between two devices on the display. Moreover, there is currently no organized manner of detecting certain conditions within a plant, such as flow conditions and mass balances, as materials move through a plant, much less an easily implementable system for performing these functions on a system-level basis.

Likewise, it can be difficult to set up or create a simulation of the process plant or a portion of the process plant as simulation activities must typically be performed separately from the display and control activities performed in the on-line environment of the process plant. Still further, if a simulation of the plant is created, it is difficult, if not impossible, to integrate this simulation with the operator displays or with the control modules being implemented within the plant.

SUMMARY

A system for facilitating configuration of a process plant is disclosed. The system may include a process graphics editor and a process module editor. The process graphics editor may facilitate creation and/or modification of a graphical representation of physical entities in the process plant. The graphical representation created and/or modified using the process graphics editor may be displayed on a display device, such as on a monitor of a workstation, for example. The process module editor may facilitate creation and/or modification of a process module. A process module may include one or more interconnected process objects representative of one or more corresponding physical entities in the process plant. Zero, one, or more of the process objects in the process module may include simulation and/or modeling capabilities for simulating/modeling operation of physical entities in the process plant.

The system may also include a supervisor module (e.g., a supervisor application) communicatively coupled to the process graphics editor and the process module editor. The supervisor module may be capable of detecting changes made to the graphical representation of the physical entities in the process plant using the process graphics editor. In response to detecting such changes, the supervisor module may instruct the process module editor to make a corresponding change, if any, to a process module corresponding to the graphical representation of the physical entities.

Optionally, the supervisor module may be capable of detecting changes made to the process module using the process module editor. In response to detecting such changes, the supervisor module may instruct the process graphics editor to make a corresponding change, if any, to a graphical representation of the physical entities corresponding to the process module.

DESCRIPTION OF THE PREFERRED EMBODIMENTS

Figure 1:
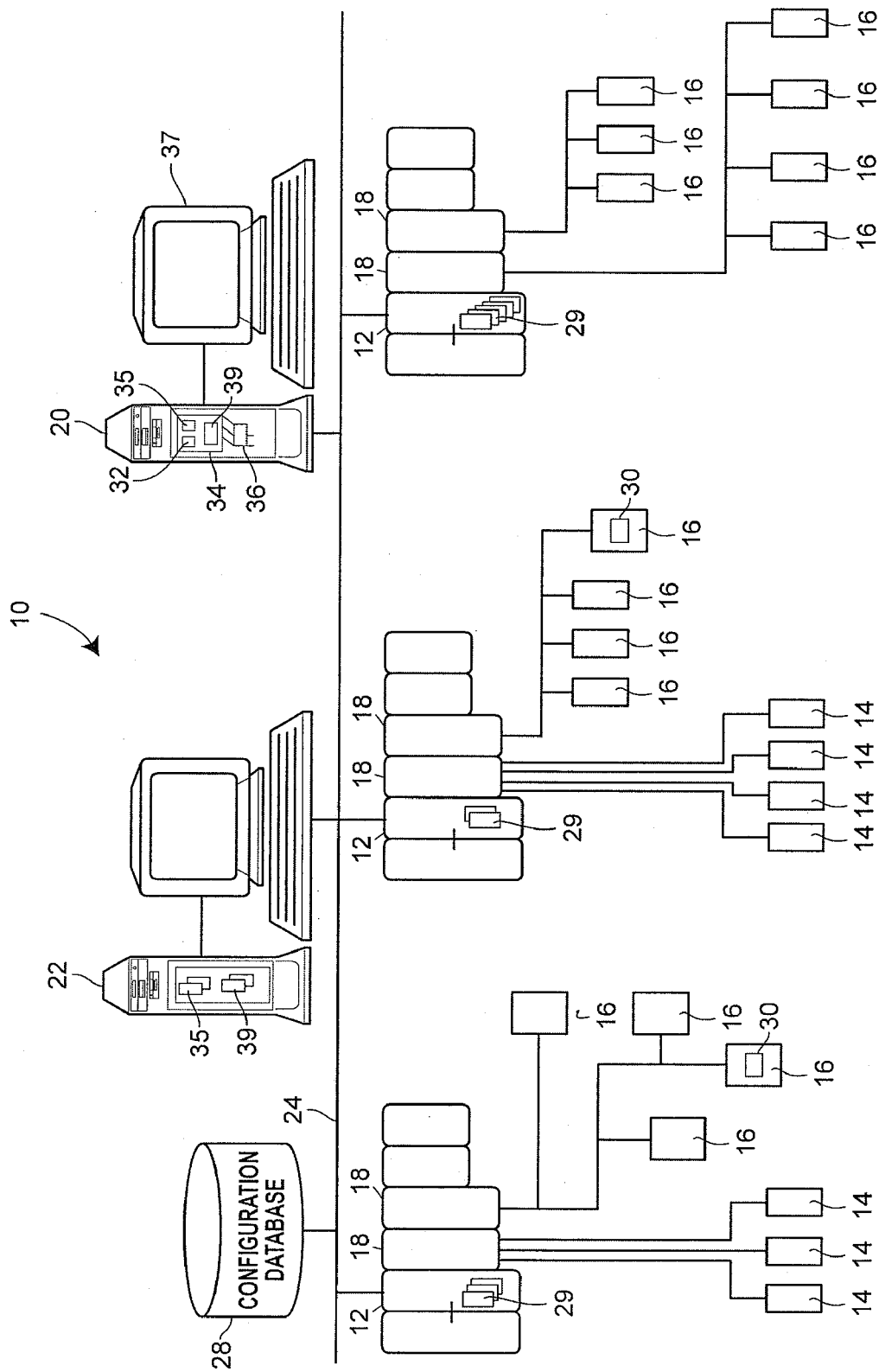
FIG. 1 is a block diagram of a distributed process control network located within a process plant including an operator workstation that implements a display routine which uses smart process objects to create process modules and graphic displays to simulate the operation of the process plant.

Referring now to FIG. 1, an example process plant 10 in which smart process objects used to form process graphic displays and process modules, both of which may be integrated with control modules to provide enhanced control and simulation within the plant environment, is illustrated in detail. In particular, the process plant 10 uses a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, an Ethernet link. A database 28 may be connected to the data highway 24 and operates as a data historian that collects and stores parameter, status and other data associated with the controllers and field devices within the plant 10 and/or as a configuration database that stores the current configuration of the process control system within the plant 10 as downloaded to and stored within the controllers 12 and field devices 14 and 16. While the controllers 12, I/O cards 18 and field devices 14 and 16 are typically located down within and distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. And are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of device. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. And the I/O devices 18 may be any types of I/O devices conforming to any desired communication or controller protocol such as HART, Fieldbus, Profibus, etc.

In the process plant 10 of FIG. 1, the workstation 20 includes a suite of operator interface applications and other data structures 32 which can be accessed by any authorized user (sometimes referred to herein as a configuration engineer and sometimes as an operator although other type of users may exist) to view and provide functionality with respect to devices, units, etc. connected within the process plant 10. The suite of operator interface applications 32 is stored in a memory 34 of the workstation 20 and each of the applications or entities within the suite of applications 32 is adapted to be executed on a processor 36 associated with the workstation 20. While the entire suite of applications 32 is illustrated as being stored in the workstation 20, some of these applications or other entities could be stored in and executed in other workstations or computer devices within or associated with the plant 10. Furthermore, the suite of applications can provide display outputs to a display screen 37 associated with the workstation 20 or any other desired display screen or display device, including hand-held devices, laptops, other workstations, printers, etc. Likewise, the applications within the suite of applications 32 may be broken up and executed on two or more computers or machines and may be configured to operate in conjunction with one another.

Generally speaking, the suite of applications 32 provides for or enables the creation and use of three different types of entities, the operation of which may be integrated together to provide for enhanced control, simulation, and display functions within the process plant 10. More particularly, the suite of applications 32 may be used to create and implement process graphic displays 35 (which generally provide an operator display pertaining to a portion of the process plant), process modules 39 (which generally provide a simulation of a portion of a process plant) and process control modules, such as the control modules 29, which generally provide or perform on-line control of the process. The process control modules 29 are generally well known in the art and may include any type of control module, such as function block control modules, etc. The process graphic display elements 35, which will be described in more detail below, are generally elements that are used by an operator, engineer or other displays to provide information to a user, such as an operator, about the operation, configuration or set-up of the process plant and the elements therein. The process modules 39 are generally closely tied to the process graphic display elements 35 and may be used to perform simulations of the operation of the process plant or of some of the different elements therein connected in the manner depicted in the process graphic displays 35. The process graphic displays 35 and process modules 39 are illustrated as being stored in and executed by the workstations 20 and 22, although the process graphic displays 35 and the process modules 39 could be downloaded to and executed in any other computer associated with the process control plant 10, including laptops, handheld devices, etc.

Figure 2:
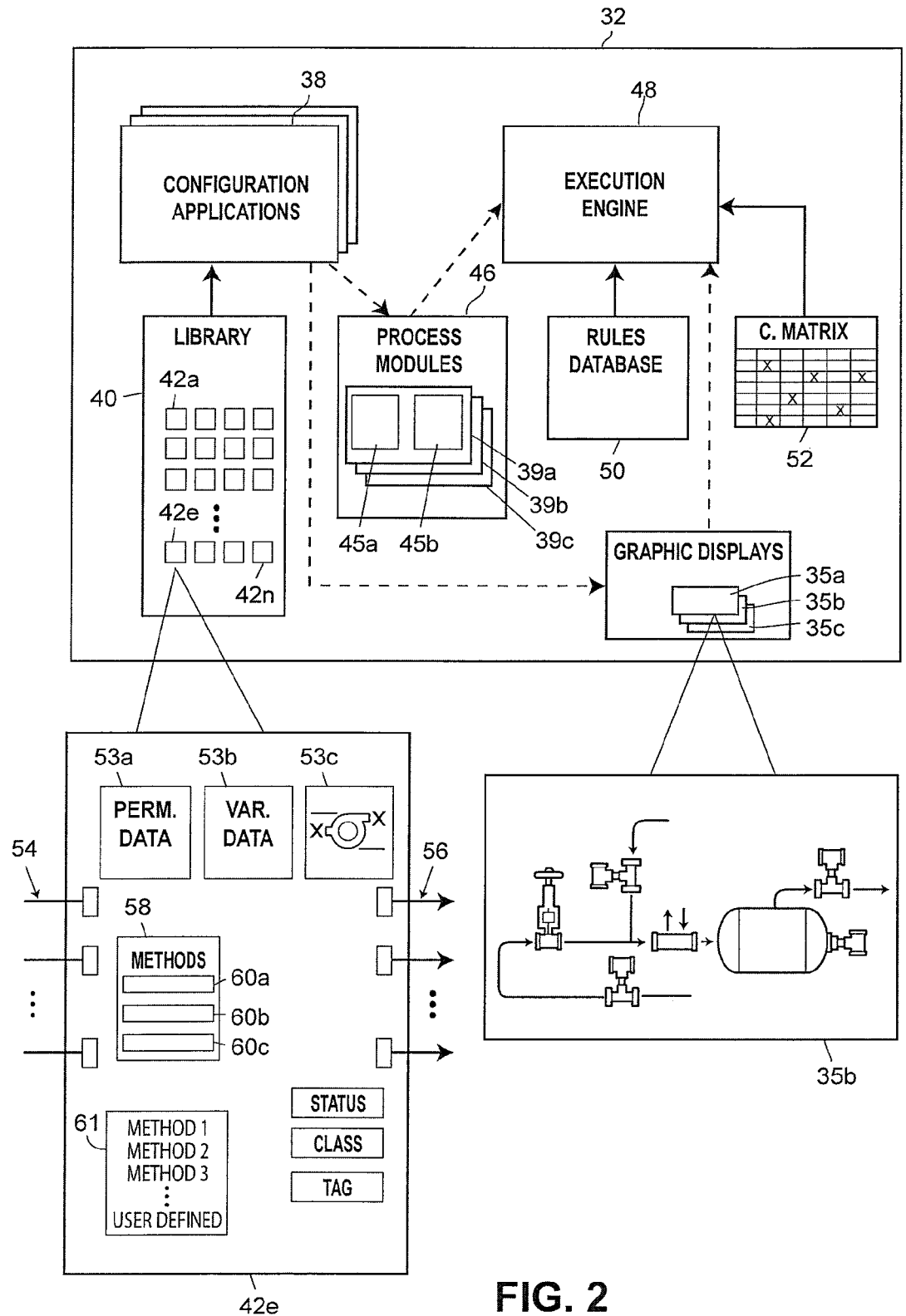
FIG. 2 is a logical block diagram of a set of applications and other entities, including smart process objects and process modules, stored in the operator workstation of FIG. 1, which may be used to implement enhanced functionality in a process plant.

FIG. 2 illustrates some of the applications and data structures or other entities within the suite of applications 32 of the workstation 20. In particular, the suite of applications 32 includes control module, process module, and graphic display configuration applications 38 which are used by a configuration engineer to create control modules, process modules (also called process flow modules) and the associated graphic displays. While the control module configuration application 38 may be any standard or known control module configuration application, the process module and graphic display configuration application may create process modules and graphic displays using one or more smart process objects, the nature of which will be described in more detail below. Still further, while the process module and process graphic configuration applications 38 are shown separately, one configuration application could create both of these types of elements.

A library 40 of smart process objects 42 includes example or template smart process objects 42 that may be accessed, copied and used by the configuration application 38 to create process modules 39 and graphic displays 35. As will be understood, the configuration application 38 may be used to create one or more process modules 39, each of which is made up of or created from one or more smart process objects 42 and may include one or more process flow or simulation algorithms 45, which are stored in a process module memory 46. Additionally, the configuration application 38 may be used to create one or more graphic displays 35, each of which is made up of or created from one or more smart process objects 42 and may include any number of display elements connected together. One of the graphic displays 35b is illustrated in FIG. 2 in expanded form and includes a depiction of a set of process elements, such as valves, tanks, sensors and flow transmitters, interconnected by connection elements which may be pipes, conduit, power cables, conveyors, etc.

An execution engine 48 operates or implements each of the graphic displays 35 and the process modules 39 during runtime to create one or more process displays for an operator as defined by the graphic displays 35 and to implement simulation functionality associated with the process modules 39. The execution engine 48 may use a rules database 50 defining the logic to be implemented on the process modules 39 as a whole and the smart process objects within those modules in particular. The execution engine 48 may also use a connection matrix 52 which defines the connections between the process elements within the plant 10 as well as within the process modules 39 to implement the functionality for the process modules 39.

FIG. 2 illustrates one of the smart process objects 42e in more detail. While the smart process object 42e is illustrated as being one of the template smart process objects, it will be understood that other smart process objects will generally include the same or similar elements, features, parameters, etc. as described with respect to the smart process object 42e and that the specifics or values of these elements, features and parameters may be changed or varied from smart process object to smart process object depending on the nature and use of that smart process object. Furthermore, while the smart process object 42e may be an object within an object oriented programming environment and thus include data stores, inputs and outputs and methods associated therewith, this smart process object may be created by and implemented within any other desired programming paradigm or protocol.

As will be understood, the smart process object 42e before being instantiated, is an object that is associated with a particular type of entity, such as a physical or a logical entity, within the process plant 10 of FIG. 1. However, after being copied and instantiated, the smart process object 42e may be tied to a particular entity within the process plant. In any event, the smart process object 42e includes a data store 53 that is used to store data received from or pertaining to the logical entity with which the smart process object 42e is associated. The data store 53 generally includes a data store 53a that stores general or permanent information about the entity to which the smart process object 42e pertains, like manufacturer, revision, name, type, etc. A data store 53b may store variable or changing data, such as parameter data, status data, input and output data, cost or other data about the entity to which the smart process object 42e pertains including data associated with the entity as it has existed in the past or as it now exists within the process plant 10. Of course, the smart process object 42e may be configured or programmed to receive this data (e.g., cost data) on a periodic or non-periodic basis, from the entity itself via any desired communication link, from the historian 28 via the Ethernet bus 24 or in any other desired manner. A data store 53c may store a graphical representation of the entity to which the smart process object 42e pertains and which is used for actual display to the operator via an operator interface, such as the screen 37 associated with the workstation 20 of FIG. 1. Of course, the graphical representation may include place holders (marked by underlines within the data store 53c) for information about the entity, such as information defined by the parameter or other variable data about the entity as stored in the data store 53b. This parameter data may be displayed in the graphical place holders when the graphical representation is presented to the operator on a display device 37 as part of one of the graphic displays 35. The graphical representation (and the smart process object 42e) may also include predefined connection points (marked by an "X" in the data store 53c) that enable an operator or configuration engineer to attach upstream or downstream components to the process element, as depicted by the graphical representation. Of course, these connection points also enable the smart process object 42e to be aware of the elements connected to that smart object as configured within a process module and may specify a type of connection element that must be used, such as a pipe, a duct, etc., a stream associated with that element, etc.

The data store 53c may optionally store a plurality of graphical representations. For example, different graphical representations may correspond to different views such as an engineering view, a maintenance view, an operator view, a management view, a trainer view, a trainee view, etc. A particular graphical representation may be utilized in generating a graphic display for a particular view, for example. Example systems and methods for creating the graphical representation are described in commonly owned application entitled "GRAPHICS INTEGRATION INTO A PROCESS CONFIGURATION AND CONTROL ENVIRONMENT," Ser. No. 10/591,804. Of course other suitable systems and methods for creating the graphical representation can be used as well.

The smart process object 42e may also include one or more inputs 54 and outputs 56 to enable communication with other smart process objects within or outside of a process module in which the smart process object 42 is used. The connections of the inputs 54 and outputs 56 to other smart process objects may be configured by a configuration engineer during configuration of a process module by simply connecting other smart process objects to these inputs and outputs or by specifying particular communications that are to take place between smart process objects. Some of these inputs and outputs may be defined as being connected to the smart process objects connected at the predefined connection points for the smart process object as discussed above. These inputs 54 and outputs 56 may also be determined or defined by a set of rules within the rule database 50 and the connection matrix 52 defining the connections between different devices or entities within the plant 10. The inputs 54 and the outputs 56, which include data stores or buffers associated therewith will, generally speaking, be used to provide communications of data from other smart process objects to the smart process object 42e or to provide communications of data stored within or generated by the smart process object 42e to other smart process objects. These inputs and outputs may also be used to provide communications between the smart process object 42e and other objects within the process control system, such as control modules within the controllers 12, field devices 14, 16, etc.

As illustrated in FIG. 2, the smart process object 42e also includes a method storage 58 that is used to store zero, one or more methods 60 (illustrated as methods 60a, 60b and 60c in FIG. 2) which may be algorithms to be implemented by the smart process object 42e during execution of a process module in which the smart process object 42e is used. Generally, the methods 60 stored in the method storage 58 will use the data stored within the data storage portions 53a and 53b and data obtained from other smart process objects or even data from other sources, such as the configuration database or historian 28, via the inputs 54 and the outputs 56 to determine information about the process plant 10 or an entity within the plant 10. For example, the methods 60 may determine poor or bad operating conditions associated with the entity defined by the smart process object 42e, errors associated with that or other entities within the process plant 10, etc. The methods 60 may be preconfigured or provided based on the type or class of smart process object and will generally be executed each time the smart process object 42e is executed within the execution engine 48 during runtime. Some example methods 60 that may be provided within a smart process object, such as the smart process object 42e, include detecting leaks, dead band, dead time, movement, variability, condition monitoring, computing costs, or other conditions associated with the entity.

The methods 60 may also be provided to help simulate the operation of the process entity associated with the smart process object on the material flowing through that process entity. Thus, the methods 60 may be provided to calculate mass balances, energy balances, flows, temperatures, compositions, vapor states, and other system-level or stream level parameters associated with the material in the plant 10, to simulate operation of the element so as to calculate expected outputs based on provided inputs, etc. Of course, these are but a few of the methods that can be stored in and run by a smart process object 42e, and there are many other methods that may be used, with such methods generally being determined by the type of entity being represented, the manner in which that entity is connected in and used in a process plant as well as other factors. It is important to note that, while the smart process object 42e may store and execute methods that detect system-level conditions, errors, etc., these methods may also be used to determine other information about devices, logical elements, such as process control modules and loops, and other non-system-level entities. If desired, the methods 60 may be programmed or provided in any desired programming language, such as C, C++, C#, etc. or may be referenced to or may define applicable rules within the rule database 50 that should be run for the smart process object 42e during execution.

If desired, each smart process object may include a library of applicable algorithms or methods which may be used to define the simulation behavior of the smart process object when connected within a process module. Such a library is illustrated in a pull down menu 61 for the smart process object 42e of FIG. 2 and a similar menu may be associated with each other smart process object. The configuration engineer may define the simulation behavior of a smart process object when this smart process object is placed in a process module 39 by selecting one of the library of simulation algorithms (called method 1, method 2, etc.) via, for example, the pull down menu 61. In this manner, the configuration engineer may define different simulation behaviors for a smart process object depending on the type or nature of the process for which the smart process object is being used to model.

If desired, the configuration engineer may instead provide a proprietary or other user supplied algorithm to define the simulation behavior of the process element defined by the smart process block. Such a user defined algorithm (illustrated as the "user defined" entry in the pull down menu 61) may be provided to and stored in a smart process object when that smart process object is placed within or used within a process module 39. This functionality enables the simulation behavior to be customized by the user to thereby provide for better or more accurate simulation. If desired, and as will be described in more detail later, the smart process objects 42 or each process module 39 may include an operator actuatable switch (such as an electronic switch or a flag) that disables the use of the simulation algorithms within the smart process objects and that, instead, causes the behavior of the process module to be determined by a high fidelity simulation package or program, such as one provided by HYSYS. In this case, the smart process object or the process module obtains simulated parameters from the high fidelity simulation, as opposed to using the simulation algorithms within the smart process objects themselves.

During execution of a graphic display 35 or a process module 39 by the execution engine 48, the engine 48 implements the communications defined by the inputs 54 and outputs 56 to each of the smart process objects in the graphic display 35 or process module 39 and may implement the methods 60 for each of those objects to perform the functionality provided by the methods 60. As noted above, the functionality of the methods 60 may be located in programming within the smart process object or defined by a set of rules within the rule database 50 that the engine 48 executes, based on the type, class, identification, tag name, etc. of a smart process object, to implement the functionality defined by those rules.

It will be noted that an instance of the smart process object 42e has a tag or unique name within the context of the process module with which the smart process object 42e is associated and this tag or unique name may be used to provide communications to and from the smart process object 42e and may be referenced by the execution engine 48 during runtime. Process module tags should be unique within the control system configuration. This tagging convention enables elements within the process modules 39 to be referenced by elements within others of the process graphic displays 35, process modules 39 and even the control modules 29. Still further, the parameters of the smart process object 42e can be simple parameters, such as simple values, structured parameters or smart parameters that know the expected units and attributes associated therewith. Smart parameters can be interpreted and used by the process rules engine or execution engine 48 to assure all signals are being sent in the same units or are converted properly. Smart rules can also be used to turn on and turn off groups of alarms for the smart process objects (or process modules) to create a smart alarm strategy and/or interface for the operator. Still further, smart process object classes can be associated with equipment and module classes within the process control strategy of the plant 10 to provide a known linkage between a smart process object and the process variables it will need to interpret or access.

Smart process objects, when used in process graphic displays or process modules, may also include mode of operation, status, and alarm behavior so that these smart objects may be put in different modes during runtime, such as the off, start-up, and normal modes, may provide a status associated with the object based on its current operating state, and may provide alarms based on detected conditions, such as a parameter out of range, limited, high variability, etc. Smart process objects may also have a class/subclass hierarchy which enables them to be categorized in class libraries, to be collected together in a composite structure, etc. Still further, smart process objects may utilize information from other elements, such as control modules and other objects to enable the smart process object to recognize when its associated entity is busy or, for example, acquired by a batch control process within the plant 10.

Smart process objects may be associated with any desired process entity, such as physical devices like pumps, tanks, valves, etc., or logical entities such as process areas, measurements or actuators, control strategies, etc. In some cases, smart process objects may be associated with connectors, such a piping, conduit, wiring, conveyors, or any other device or entity that moves material, electricity, gas, etc. from one point to another point within the process. Smart process objects that are associated with connectors, sometimes referred to herein as smart links or connector elements, are also tagged (even though the actual device or connector itself may not be tagged or able to communicate within the process plant 10), and are generally used to represent material flow between other elements in the process.

Smart links will typically include properties or parameters that define how different materials or phenomena (such as electricity) flow through the connection (e.g. steam, electricity, water, sewage, etc.) These parameters may indicate the type and nature of flow (such as the general speed, friction coefficients, type of flow like turbulent or non-turbulent, electromagnetic, etc.) through the connector and the possible direction or directions of flow through the connector. Smart links may include programming or methods that ensure that the units of the source and destination object to which the smart link connects match and, if not, may perform a conversion. The methods of the smart link may also model the flow through the connector using a model or an algorithm to estimate the speed or nature of the flow through the actual connectors, length and size of the physical connections, transport delay, etc. The stored parameters for the smart process object (such as friction parameters) may be used in these methods. Thus, in essence, the smart links or connector elements enable smart process objects to be aware of the other upstream and downstream objects or entities. Of course, smart links may, for example, define the connections between other objects, the type of fluid, such as liquid, gas, electricity, etc. within the system, the upstream and downstream side of the entities, which other entities are upstream and downstream of the entity for this smart process object, the direction of material, fluid, electric flow, etc. in any desired or convenient manner. In one embodiment, the matrix 52 may be created prior to execution of process flow modules and may define for the smart links the interconnections between the different devices within the plant and, therefore, the interconnections between the different smart process objects. In fact, the execution engine 48 may use the matrix 52 to ascertain the upstream and downstream entities and thereby define the communications between the smart process objects and the methods associated with the smart process objects. Still further, one or more sets of rules may be provided to be used by the smart process objects to interact with each other and to obtain data from each other as needed for the methods within the smart process objects and to resolve the impact of smart objects associated with output connections.

If desired, the smart process object 42e may also include hot links, such as URLs, to key documentation which may be applicable to the type of object, or which may be specific to the instance (depending on the criticality and application) of the device to which the smart process object 42e pertains. The documentation may be vendor supplied as well as user-specific. Some examples of documentation include configuration, start-up and shut-down procedures, operational and maintenance documentation. If desired, an operator may click on the object as displayed in an operator display to bring up the instance specific (if any) and generic documentation for the object or associated device. Also, the operator may be able to add/delete/change documentation independently of the system software such as maintenance requests, records of operational problems, etc. Furthermore, these hot links may be user configurable or changeable to provide the ability to add knowledge links to objects in the an operator interface, to provide for quick navigation to appropriate information associated with the object and to provide the ability to add work instructions specific to the customer, to the specific object type or even to the specific instance of the object.

While the process modules and process graphics are described above as being created together by the interconnection of different smart process objects, they may be created separately. For example, a process graphic may be created using smart process objects and, when completed, a process module for that graphic may be generated based on graphic elements and their interconnections in the graphic display. Alternatively, the process module may be first created using smart process objects and, once created, a graphic display for that process module may be automatically generated by the configuration application 38 using the graphic display elements in the smart process objects used to create the process module. Still further, a process module and a graphic display may be created separately and the individual elements within these two entities may be tied together manually by referencing one another (e.g., using the tag properties of the elements within the graphic display and the process module). Through this mechanism, a smart process object may be referenced by multiple displays. In any event, once created, a process graphic display and an associated process module may be run independently or separately, although they will typically communicate parameters and information back and forth as desired or needed.

In order to be more comprehensive, certain possible features and examples of smart process objects that may be used in or to create process graphic displays and process modules will be described in more detail below. Thereafter, a manner in which process graphic displays and process modules, created using the described elements and features, may be integrated with control modules to provide advanced control and simulation capabilities will be described. It will be understood, of course, that the smart process object elements and features are not limited to the elements and features discussed herein and that other features and elements could be used in or to create one or both of process graphic displays and process modules, if so desired.

Generally speaking, a set of predefined graphic elements may be provided in the configuration application to enable a user to construct operator or graphic displays that reflect the process plant. These graphic elements are designed to dynamically show on-line measurements and actuators that interface with the control system. In addition, unmeasured parameters that reflect process operation may be calculated using on-line process simulation provided in the process modules and may be shown as an integral part of the associated graphic displays.

Additionally, in an offline environment used for engineering or training simulation purposes, the process simulation provided by the process modules may be used in place of the process measurement values in the graphic elements and in the associated control modules. These values, which are calculated by the associated process modules, may be based on the actuator position or state as well as manual disturbance values illustrated in the process graphics. In this manner, the graphic displays and control modules may be used in both on-line or control situation and in off-line or simulation situations. Also, while the static portion of the graphic elements will, in many cases, appear similar to the three dimensional components included in known graphics libraries, further unique features or properties of these graphic elements, the information displayed with these elements, and their links to the control system I/O and process simulation modules is described below with respect to a number of possible types and examples of graphic elements.

Generally speaking the graphic elements and simulation algorithms in the process module associated with a smart process object fall into a one of a number of different types of process elements including stream elements, process connection elements, actuator elements, processing elements, measurement elements and estimated property elements. Stream elements generally define a stream of material in the process plant and may be exposed in the graphic display to show the composition, density, flow, temperature, pressure, weight, and/or any other parameters defining the stream of material. Stream elements may be defined at the input of the process module and provided to elements within the process module to thereby enable the flow of material through the process module to be modeled and depicted in the graphic display. Similarly, stream elements may be illustrated at the output or end of the process module to illustrate in the graphic display the material output of the portion of the process plant depicted by the graphic display. Stream elements also may be used to define how different graphic displays (and the associated process modules) are connected with one another. For example, the output stream in one process module may be the input stream in another process module and may supply the values used at the input stream of the other process module. Streams may contain the following four parts: name (e.g., pH stream), direction (e.g., flow input), measurement (e.g., flow, pressure, temperature), and composition (e.g., nitrogen, ammonia, etc.) However, streams could have other parts or parameters if so desired.

Process connection elements define the manner in which materials within the plant, such as solid materials, liquid and vapor, and gases are delivered or carried from one device to another. To clearly illustrate the material flow through the process, three different types of process connections including piping, ducts and conveyors may be used. Of course other connection elements, such as electrical cables to address power flow in electrochemical processes, etc. may be used as well. Piping is generally used to illustrate (and simulate) liquid and high pressure vapor or gas flow within the plant. Ducts are generally used to illustrate (and simulate) low pressure gas flow within the plant. Conveyors are generally used to illustrate (and simulate) the movement of solid material between processing units. As a result, each process connection element defines the type of connection, such as a pipe connection, a duct connection or a conveyor connection that is used to provide material at the input or output of a device.

If desired, the properties of the material that is being transferred by a connection are determined by the upstream input. This information plus a connection status variable defining if the connection is complete may be made available as properties of the connection element on the graphic display. A connection element may start at a processing element output, an actuator element output or a stream element output. In a similar manner, a connection element may terminate at a processing element input, an actuator element input or a stream input.

The properties of a connection element may be automatically displayed when the cursor is placed over the connection element in the graphic display. Also, the properties associated with a connection element may be exposed for permanent display by placing a measurement or estimated property element (defined below) on the connection element. If desired, a connection element may be created by holding the left mouse button down over an element output (such as a stream output, a processing element output or an actuator element output) and, while holding down a button on the mouse, positioning the cursor over an element input For the connection to be established successfully, the input and the output types (pipe, duct, or conveyor) of the upstream and the downstream elements must match. The connection will automatically take on the type of the upstream element.

If desired, piping elements can be shown or depicted in the process graphic display as a pipe connection, duct elements (e.g., air or gas) can be shown as a duct and conveyor elements may be shown as conveyor belts. Piping, duct and conveyor element connections can be automatically routed between processing elements and arrows may be displayed outside the depiction of these elements to show the direction of the flow. If an upstream output is common to two connections, then a "T" element may be included in the pipe, duct or conveyor. Similarly, "T" elements may be used to combine multiple outputs. The color or other graphic property of a conveyor element may change to indicate its status, e.g., running/stopped, flowing/not flowing, plugged, etc. Generally speaking, the material flow along a conveyor is determined by the motor drive connected to the conveyor. Thus, a motor drive actuator (which is an actuator element described in more detail below) may be connected to the conveyor. Additionally, measurement elements (described below) can be connected to pipe, duct and conveyor elements to make it possible to expose measurements associated with the pipe, duct or conveyor elements, such as the speed of the conveyor or the flow of material in a pipe or duct, the properties of the material on or in the conveyor, pipe or duct, e.g. moisture or weight. Also, an exposed property element may be added to display properties of the material on or in the pipe, duct or conveyor that are not measured, for example, the composition of the material.

If desired, each of the piping, duct and conveyor connection elements may graphically and dynamically reflect a lost connection (e.g., by a color change), and that a selected property (pressure, temperature, length, etc.). is outside configured limits (e.g., by a color change). Furthermore, parameters calculated by the associated process module may be exposed in the graphic. For example, properties provided by the upstream connection, whether the connection status is bad or good, limits on one or more selected parameters of the connection element, etc. may be exposed in the graphic display to provide information to the operator about the connection element or the stream being transferred by the connection element.

Generally speaking, actuator elements are elements that perform some actuation function with respect to the stream and may be placed between different connection elements or between a processing element and a connection element. Examples of actuator elements include a regulating valve (with actuator), an on-off valve (with actuator), a pump (with motor), a force draft fan (with motor), an induced draft fan (with motor), an eductor (with on-off valve), a damper (with drive), a feeder (with variable speed motor) a conveyor motor drive (which may be attached to a conveyor element), etc.

The graphic depiction of the valve elements may dynamically reflect the implied valve position (by animation, for example), valve failure (by a color change, for example), the valve full open/closed position (by a color change, for example), and the AO, DO, DC, setpoint, PV, OUT, mode, etc. (by a numeric string or other indication, for example) of the associated control block controlling that valve. The simulation element associated with the valve elements (used in the process module) may have simulation algorithms that calculate parameters associated with the valve actuator, such as the discharge pressure, mass flow, liquid temperature, liquid composition, inlet pressure, and outlet pressure. These simulated or calculated parameters may be exposed in the process graphic, if so desired. However, the user or configuration engineer must usually configure the reference to an AO, DO or DC block in a control module associated with the valve as well as the valve type (e.g., linear, quick opening, equal percentage, valve sizing, etc.) And the stroke time from open to close. Of course, the simulation algorithms available to simulate the operation of the valve on the material flowing through the valve may be dependent upon the type of the valve and sizing information.

The graphic depiction of pump elements may dynamically reflect the motor status (using, for example, a color change), the associated DO or DC function block mode and setpoint (using, for example, strings), the motor speed (if variable speed drive is used), the AO setpoint, PV, OUT mode (if variable speed drive is used) and other desired parameters. Likewise, the process simulation (used in the process module) for this element may determine or calculate parameters such as the discharge pressure, liquid composition, liquid temperature, and mass flow, which parameters may be exposed in the graphic display. The user may need to define a pump curve based on the pump type. However, the user may configure the reference to the DO or DC block associated with the motor start/stop, the reference to the associated AO function block for variable speed drive (if used) and the pump curve (e.g., pressure versus flow) for the defining the operation of the pump.

The graphic depiction of a force draft or an induced fan actuator element may have a depiction that dynamically reflects the motor status, DO or DC function block mode and setpoint, motor speed (if variable speed drive is used), the AO setpoint, PV, OUT, DO or DC function block mode (if variable speed drive is used) and other desired parameters, any of which may be exposed in the graphic display. The process simulation element (used in a process module) for this element may determine or calculate parameters such as the discharge pressure, gas composition, gas temperature, and gas mass flow, which parameters may be exposed in the graphic display. The user may configure the reference to the associated DC block for motor start/stop, the reference to an AO block for variable speed drive (if used) and the fan curve (pressure versus flow) for defining the simulated operation of the fan.

In some cases a particular type of actuator may only be used with a specific type of connection, e.g., a pipe, a duct or a conveyor. The table below defines some example connection limitations for typical actuator elements.

|                  | Pipe | Duct | Conveyor |
|------------------|------|------|----------|
| Regulating valve | X    |      |          |
| On-Off Valve     | X    |      |          |
| Pump             | X    |      |          |
| Eductor          | X    |      |          |
| Force Draft Fan  |      | X    |          |
| Induced Draft Fan |     | X    |          |
| Damper Drive     |      | X    |          |
| Feeder           | X    |      | X        |
| Motor Drive      |      |      | X        |

Processing elements include plant equipment that processes the materials or streams in the plant in some manner. Generally speaking, all inputs and outputs to and from processing elements will be made through connection elements. Standard processing elements include tanks (vertical and horizontal), heaters, static mixers, reactors, mixers, air heaters and any other elements that perform some type of simple or standard processing activity. For standard processing elements, the user may specify the number of inputs and outputs to the element along with the physical equipment properties e.g. size, volume, etc. The simulation algorithm and static representation of these standard processing elements may be set so that they cannot be modified by the user but may be selectable as described above at configuration time. Of course, if desired, other, typically more complex plant equipment (such as distillation columns, evaporators, separators, boilers, etc.) may be implemented as custom processing elements. The static representation, number of inputs and outputs and the simulation algorithm of such custom processing elements may be modified to meet the user interface requirements. Once a custom processing element has been defined, it may be saved as a composite or template that may be reused or used as a starting point in the creation of other processing elements.

The tank standard processing element (either vertical or horizontal) may be configured based on the pipe connections to the tank and the tank element may dynamically reflect the level in the tank (using, e.g., dynamic animation), and the level at 100% or empty (using a color change, for example). The process module simulation for the tank may calculate and expose, via the graphic display, parameters such as the outlet temperature, the outlet composition, the liquid temperature and the simulated level of the tank. However, to tie the tank into the system, the user or configuration engineer may need to configure the number of input and output connections, the complete connections to the tank, the tank properties, such as size (e.g., diameter and height), etc.

The heater processing element may dynamically calculate and reflect, via the graphic display, the heat transfer coefficient (e.g., using a color change), the outlet product temperature, the inlet product temperature, the outlet pressure (assuming fixed drop), etc. A user or configuration engineer may need to configure the complete connections to the heater, the heater surface area and the heat transfer coefficient when clean.

Of course, other processing elements such as a static mixer, a reactor, a mixer, an air heater, a heat exchanger, etc. may have display and simulation capabilities that are tailored to these types of devices. Non-standard processing elements, such as distillation columns, evaporators, separators, boilers, etc. may be represented graphically using a custom processing element in which the simulation associated with the vessel may be user defined if not included in a standard selection. The processing in these elements may be described or defined as a step response model relating each input to each output of the vessel. Inputs may be gas and/or liquid streams. Optionally, the user may define the equations that describe the relationships between the inputs and outputs of the processing element and these equations may be stored in the process module using that element to perform simulation. If desired, some simple static graph representations may be provided to help the user quickly create the static graphics associated with a custom processing element. If these simple graphics are used, then the user may need to only specify the desired number of input and output connections and the type of connection supported (e.g., pipe, duct, or conveyor) supported by the custom processing element. In response, the graphic item will be displayed and can be immediately used in the creation of the operator graphic. If desired, the gains and any dynamics associated with each input and output of the process element may be specified if the user elects to specify the simulation algorithm as step responses. If the user selects a custom algorithm, then an expression editor may be provided for the user to define the simulation algorithm. Based on the method selected, the properties of the custom processing element outputs may be calculated differently. Furthermore, the user may reference one or more of the algorithms that they have defined in a separate software assembly.

Additionally, several pre-defined composites or templates may be provided for creating custom processing elements. These templates may include, for example, a boiler template having a custom algorithm that calculates the exit gas $O_2$, the exit gas CO, the steam generated, the boiler drum level and the boiler draft. Such a template may be based on a single fuel input. However, by modifying the template, it is possible to simulate boilers with multiple fuels. Other pre-defined templates may include a specialized vessel-cyclone separator template, which may be used with in conjunction with the spay dryer custom processing element, and which may include a step response model to model the operation of the separator. Likewise, a column template, a spray dryer, and an evaporator body may utilize a step response model to define the expected process response. In an evaporator, based on the energy input and the concentration of the input flow, the concentration of the outlet flow and vapor release can be calculated. Multiple evaporator elements may be connected together along with heat exchanger and eductor elements to create a multiple-effect evaporator. Similarly, a specialized vessel-stack custom template processing element may be used with the boiler processing element. In this case, the properties of the inlet may be carried through the stack with no modifications if so desired, or to reflect emissions reductions performed in the stack.

Other types of elements that can be used to create graphic displays and process modules include measurement elements and property elements. Measurement elements include transmitter elements, which may be used in the graphic display to access the measurement value associated with a physical transmitter, and switch elements. Generally, the transmitter element may dynamically reflect bad or uncertain status, the mode of the associated AI function block in the control module, the measurement value and units, etc. associated with an actual transmitter (sensor) or other data associated with the actual transmitter. In an off-line mode (or simulation mode) the transmitter element may be used to access and display the simulation value provided by the process module rather than the value associated with the AI or PCI block or may be used to provide a measurement value to the associated AI block in the control module as a measurement to be used in the simulated control routine. The transmitter element can be added to a connection element or to a processing element and, when such a transmitter element is added to the display, the user will generally need to identify the associated AI, PCI or DI block in controller scheme that is providing the measurement. In the on-line mode, the value of the measurement may be shown next to this measurement element. In the off-line mode (or simulation mode) the simulated value of the measurement (as developed by the corresponding process module) may be automatically displayed. In on-line operation, the user can elect to switch control and display to the simulated value in the event of a measurement failure.

A switch element may dynamically reflect a bad or uncertain status, the mode of the associated DI (e.g., manual or OS), and the discrete value of a switch (on, off, etc.) When in an off-line simulation mode, the user may use the switch display element to access and change the switch parameters in the graphic display and control module by selecting a simulation value or a manual value and status and by manually entering the value and status of the switch. However, a user must generally configure the switch element by providing a reference to an associated DI block in the control scheme, a reference to the element property that triggers the switch and the limit and deadband associated with a change of state of the switch.

An estimated property element generally exposed an estimated property of the system as determined by the process module and may be added to a connection or processing element to display any property of that element. When this element is placed on a connection element or on a piece of equipment, the user can browse and select the properties that will be displayed. Thus, simulated properties that are not available through a physical measurement may be exposed through the use of the estimated properties element. Such an estimated property element may dynamically reflect a good/bad connection, the estimated property value(s), and a property that is outside of an associated limit or change. A user must generally configure the reference to property(s) to be displayed and the limits and color changes for the element if the property is outside of the limits.

As will be understood, by attaching transmitter elements and estimated property elements to processing elements, actuator elements and connection elements, the properties associated with the inputs and outputs of these process elements may be referenced during on-line operation or off-line simulation. These properties may also be made visible in the graphic display.

Figure 3:
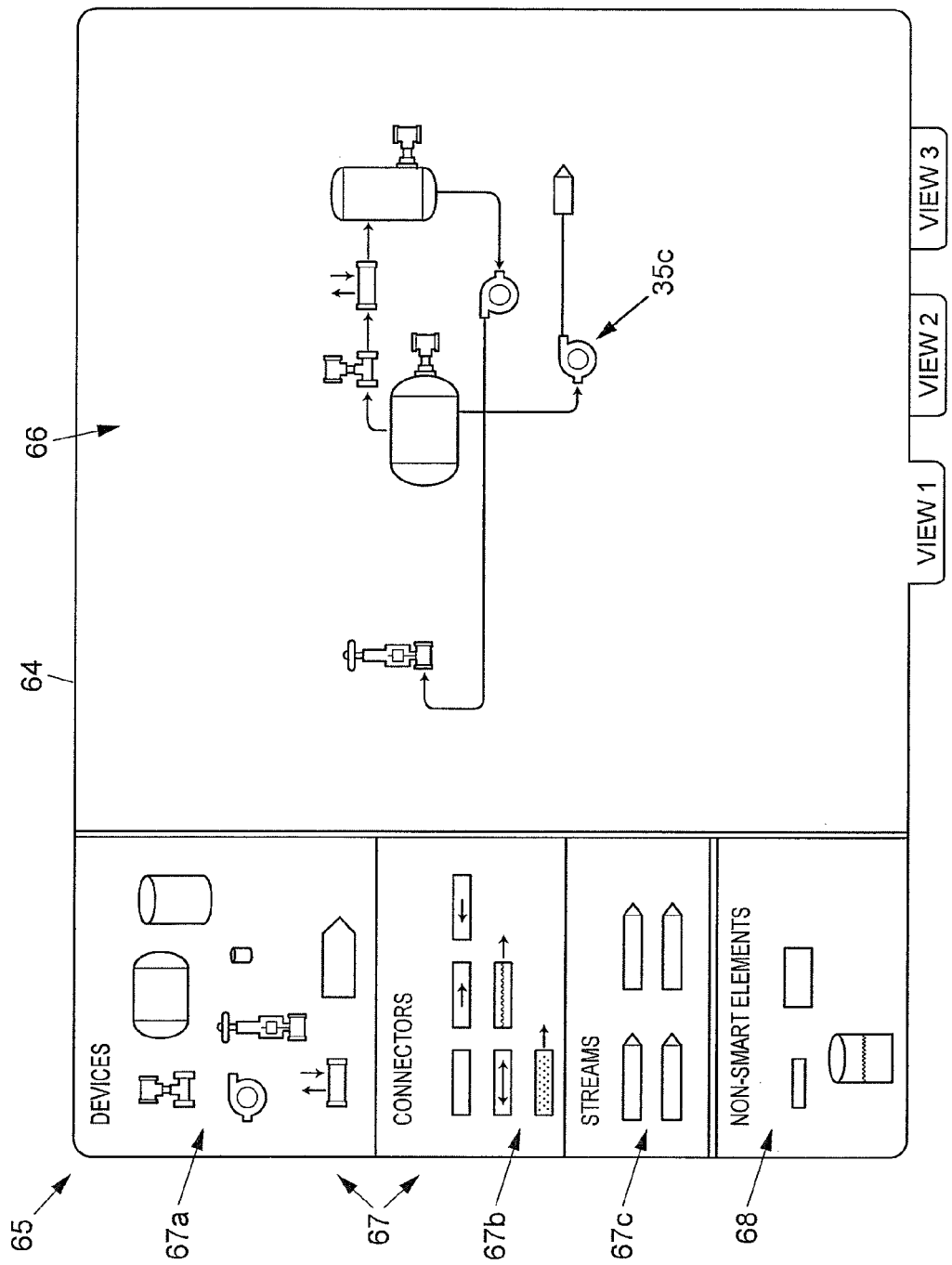
FIG. 3 is a simplified depiction of a configuration screen used by a configuration engineer to create a process graphic display or a process module using smart process objects stored in an object library.

Generally speaking, an operator may run or execute the configuration application 38 to create one or more process modules 39 or graphic displays for implementation during operation of the process 10 or for implementation in a simulation environment. In one embodiment, the configuration application 38 presents a configuration display, such as that illustrated in FIG. 3, to the configuration engineer. As seen in FIG. 3, a configuration display 64 includes a library or template section 65 and a configuration section 66. The template section 65 includes a depiction of sets of template smart process objects 67, which may include the smart process objects 42 of FIG. 2 and may be any of the connection, measurement, stream, processing, and estimated property elements described above. If desired, non-smart elements 68 that only have a graphic definition may also be provided. Essentially, the templates 67 and 68 are generic objects that may be dragged and dropped onto the configuration section 66 to create an instance of a smart process object within a process module or graphic display (or both). A partially completed process graphic display 35c is illustrated as including a valve, two tanks, two pumps, a flow transmitter and two sensors interconnected by flow path connectors, which may be smart links or connector elements as described above and providing a stream output. It will be noted that the graphic display 35c may be made up of both smart process objects and non-smart elements.

When creating a graphic display, such as the graphic display 35c (or a process module), the configuration engineer may select and drag the smart process objects 67 and the elements 68 illustrated in the template section 65 onto the configuration section 66 and drop them there in any desired location. Generally, the configuration engineer will select and drag one or more smart device process objects 67a or non-smart elements 68 depicting devices onto the configuration section 66. The configuration engineer will then interconnect the smart device process objects within the configuration section 66 with smart connector process objects 67b and may place input and output streams 67c into the display. Moreover, non-smart elements may be added to the display such as a static text element. The configuration engineer may change the properties of each of the smart process objects during this process using pop-up properties menus, etc. And, in particular, may change the methods, parameters, tags, names, hot links, modes, classes, inputs and outputs, etc. associated with these smart process objects. When the process or configuration engineer has created a process module with each of the desired elements, typically representing a process configuration, area, etc., the configuration engineer may define rules or other functionality associated with the module. Such rules may be execution rules such as those associated with the performance of system-level methods, like mass balance and flow calculations. The process engineer or operator may also decide to add trends and faceplates that would be useful when the process display is on-line. After creating the graphic display 35c, the configuration engineer may save that display in a memory and may, at that time, or later, instantiate and download that display to the execution engine 48 in a manner that the execution engine 48 may provide a graphic display. Of course, the configuration engineer could create a process module in the same or similar manner although different graphics may be depicted for process module elements as opposed to process graphic display elements. Furthermore, the operator may elect to turn on levels of detail while they are running the plant. For example, one of the levels of detail would show the composition at each connection.

As noted above, the process graphic or process module may be provided with a specific tag. For example, smart process objects elements within a graphics display or a process module may be provided a tag including an alias that can be filled in or selected at runtime by, for example, the execution engine 48 based on other factors, such as a piece of equipment or a route selected within the process control system. The use of alias names and indirect referencing in process control systems is discussed in detail in U.S. Pat. No. 6,385,496, which is assigned to the assignee of the present invention and which is hereby expressly incorporated by reference herein. Any of these techniques may be used to provide and resolve aliases in tags for the smart process objects described herein. With the use of aliases and the like, the same process module may include or be used to support different views for sets of equipment, etc.

The display 64 of FIG. 3 illustrates tabs (View 1, View 2 and View 3) for different views of a process module or graphic display. These tabs may be used to access and create different views for different users associated with the process using some of the same smart process objects therein.

Generally speaking, when the configuration engineer creates a process module or a graphic display, the configuration application 38 automatically stores the smart process objects, along with the connections therebetween, in a database. This database can then be used to create other process modules and graphic displays which may, for example, provide different views using one or more of the same smart process objects. As such, when creating the second view, the configuration engineer can simply reference the smart process object, as already created and stored within the database, and any methods, etc. stored therewith to place that smart process object in the second view. In this manner, the database can be populated as the process control modules and graphic displays are created and the database can be used at any time to create and execute other views, modules, and graphic displays using smart process objects which already exist within the process flow database. Using such a database, each smart process object within the database may support or be used in process modules and referenced in multiple graphic displays. As will also be understood, the process modules may be constructed by building displays for these modules and then specifying flow algorithms to be used in or associated with process modules. Of course, individual process modules may be spread across and executed by different computers and process modules may be communicatively connected to one other to operate in conjunction with each other, either on the same or on different computers. When this is done, input and output streams will be externally referenced to tie process modules together.

As noted above, the configuration engineer may, as part of the process module or graphic display creation, attach or provide the simulation algorithm of the process module. These simulation algorithms may be preconfigured to calculate or determine certain process or system-level properties, such as mass balance calculations, flow calculations, efficiency calculations, economic calculations, etc. with respect to the process depicted or modeled by the process module. As a result, the process modules themselves may have mode, status, and alarm behavior, can be assigned to workstations, and may be downloaded as part of the display downloads. If desired, the simulation algorithms may be executed by the execution engine 48 to perform mass or heat balancing, flow routing, flow efficiency, flow optimization, economic calculations related to process simulation or other desired calculations using the data provided in the smart process objects of the process module. Still further, these simulation algorithms may access parameters from the control strategy, i.e., the control modules associated with and downloaded to the controllers, field devices, etc. And may, conversely, provide data or information to these control modules.

It will be understood that the execution engine 48 is needed to enable the process algorithms to execute across an amalgamation of all process objects and links configured on all displays. Thus, the simulation algorithms (within the process modules) will generally execute regardless of whether any associated graphic display is loaded, i.e., called up and displaying information to a user. Of course, the simulation algorithms may be cross-checked across the entire process 10 or across defined subsets of the process 10. It will also be understood that, during execution of any particular process module, the execution engine 48 may provide a display to an operator on an operator interface depicting the interconnected objects or entities within the process module based on the graphic display associated with that process module. The parameters, graphics, etc. of the display will be determined by the configuration and interconnection of the smart elements within the process module. Furthermore, alarms and other information to be provided on this or other displays may be defined and generated by the methods within the smart process objects and the simulation algorithms associated with a particular process module. If desired, the execution engine 48 may provide a display for a process module to more than one operator interface or may be configured or set to provide no display, even though the execution engine 48 continues to execute the process flow module and thereby perform the methods, alarm behavior, flow algorithms, etc. associated therewith.

If desired, a process module may be automatically generated from a graphics display (or vice versa) and the functionality available to the process module is determined by the process graphic elements. What should be clear is that the process module is preferably constructed to shadow the process graphic display. As a result, when the user configures a process graphic display, the user has the ability to include additional information for the process module such as mass or energy streams. These streams are used in the process module to establish starting conditions needed by the simulation function blocks.

Additionally, because process modules are actual software modules run in a computer, it is also possible for them to reference, and be referenced by controller modules to use the parameters, control strategies, displays, etc. associated with the controller modules. Also, using this capability, it is possible for a process module to be created independently of the process graphic display.

Generally speaking, process modules will be made of processing elements, streams, and their associated connections. Because there is a one-to-one correspondence between the process graphics elements and the simulation elements (in the process modules), it will be possible for a user to construct a graphic display and to automatically generate the corresponding process module from that display. Of course, if desired, the user may create the process module and then automatically create the graphic display from that module using the graphics within the smart process objects. However, to allow the automatic generation of a process module, it may be necessary for the user to identify the actuator, connection or processing element properties associated with the measurement elements and estimated property elements. A user may also need to create a process simulation before creating the process graphics or, in some cases, before the control modules are constructed. After the simulation is constructed, it will be possible to fill in the references to the I/O blocks in the control module. Also, when the associated graphic display is created, it will be possible to browse to the existing process module to set the property references.

In some cases the process graphic may not contain all the detail needed to construct the process simulation. Thus, it is desirable to provide an editor to enable the user to edit the simulation or process modules that have been automatically created from a process graphic. Also, because multiple process graphics may need to display the same piece of equipment, it may be necessary in the construction of a process graphic for an element to be able to reference an existing process module.

Generally speaking, the simulation that corresponds to the processing elements will have a common structure. If desired, the block input connections and the parameters of the simulation are stored in the process module so that no reference to a control module is needed. Furthermore, the number of input and output connections supported by the simulation may be defined as extensible, results from the simulation execution may be reflected in the simulation output connections or as parameters of the simulation and the simulation algorithm may be defined as a step response or may be entered by the user. When the simulation algorithm is entered by the user, the user may independently specify a dynamic for each output.

Still further, a common set of parameters may be supported for input and output connections. The parameters associated with input and output connections may be communicated between blocks as an array parameter or structure and may include parameters such as a connection status (e.g., good, bad, limited, etc.), a mass flow parameter, a pressure parameter, a temperature parameter, a specific heat parameter, a density parameter, a flow not possible parameter, a pressure basis for pressure/flow network parameter, a flow basis for pressure/flow network parameter, or any other desired parameter. In some cases, other parameters such as the composition of a stream may be provided and used in the simulation algorithm. To support this requirement, a standard and extended stream element may be provided. As part of the extended stream element configuration, the user may select a set of pre-defined groups of data to define the stream element. Such extended connections will only be allowed to connect to a block that utilizes this information. In general, the extended parameters may include a group name and a number of specific elements. For example, a fuel input stream to a boiler processing element may contain the components of the fuel including a fuel set, the amount of carbon, hydrogen, sulfur, oxygen, moisture and nitrogen in the fuel (all in weight % if desired). As another example, a turbogenerator processing element may use a steam stream and the connections to the associated simulation may use an extended parameter set that includes a steam set, steam enthalpy (actual) entering the stage, steam enthalpy (actual) exiting the stage, steam enthalpy (if isentropic expansion), etc.

The expanded group set may also be used when simulation elements within a process module are used as an interface to high fidelity simulation packages. In this case, the composition of some streams can be made visible in the process graphic. Also, if desired, an interactive editor may be provided to make it easier to create or modify the values displayed on a graphic display, as well as associated faceplates and detail displays for control modules to be presented on the graphic displays.

Figure 4:
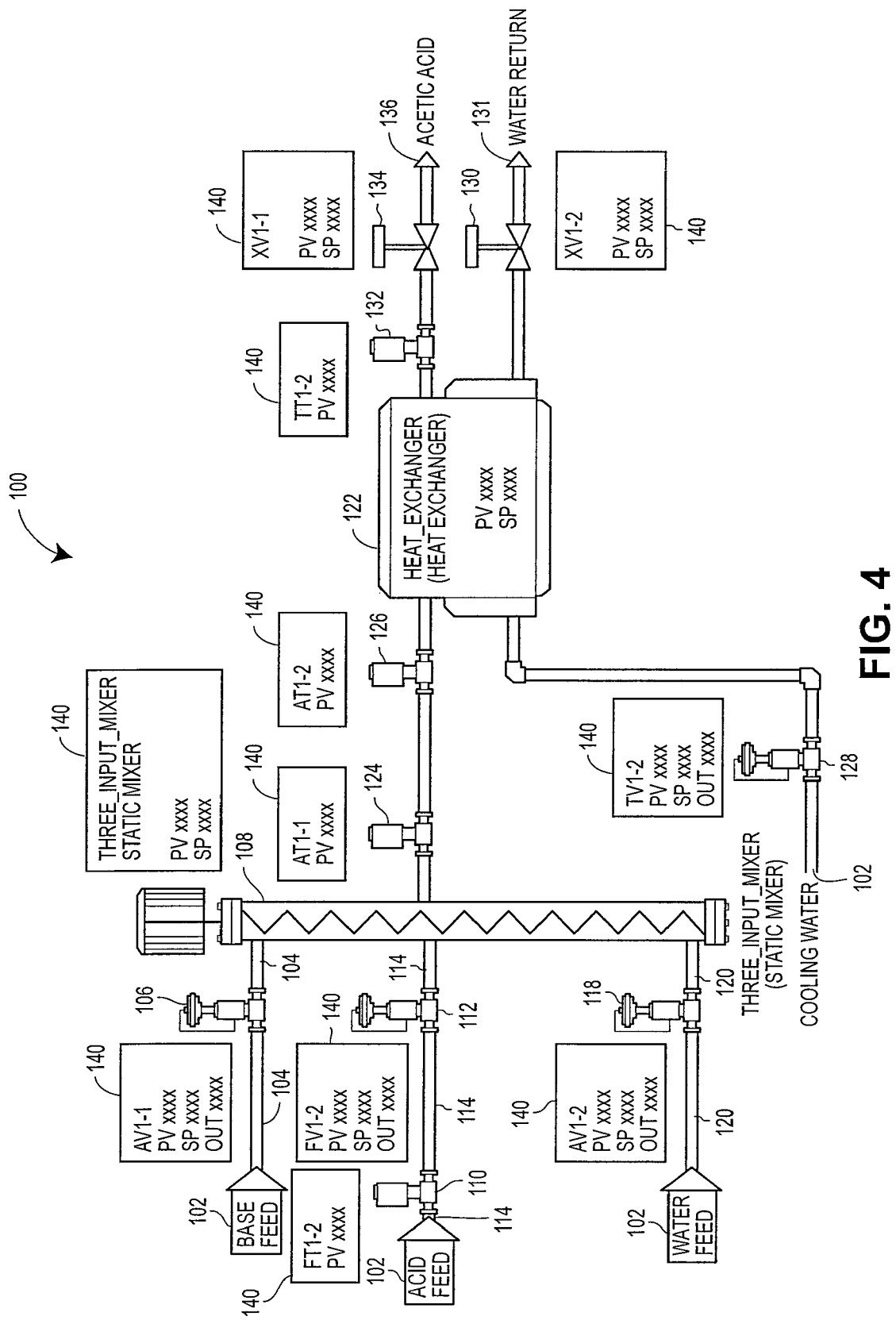
FIG. 4 is a detailed depiction of an example process graphic display including the depiction of streams and connection elements within the process plant, created by interconnecting the graphic display elements of a number of smart process objects.

FIG. 4 illustrates an example graphic display 100 that may be created using the elements and configuration applications described above. In particular, the graphic display 100 depicts a portion of process plant that produces white vinegar from water, acid and a base. As illustrated in FIG. 4, the process graphic display 100 includes four stream elements 102 at inputs thereto defining the streams of Base Feed, Acid Feed, Water Feed and cooling water. The Base Feed stream 102 is delivered through a piping connection element 104 to an actuator element in the form of a valve 106. The output of the valve 106 is connected to a first input of a mixer 108 via a piping connection element 104. In a similar manner, the Acid Feed 102 is connected to a transmitter element 110 and then to a further valve 112 which is connected to the mixer 108. The Acid Feed 102 and transmitter 110, the transmitter 110 and the valve 112 and the valve 112 and the mixer 108 are connected via piping connection elements 114.

As can be easily seen, an output of the mixer 108 is connected to a heat exchanger 122 via piping and two transmitters 124 and 126. The cooling water stream 102 is delivered to the heat exchanger 122 via a valve 128 and exits the heat exchanger via a valve 130 to produce a return water stream element 131. Likewise, the output of the heat exchanger 122 is delivered through a transmitter element 132 and a valve 134 to provide an output Acetic Acid stream element 136. While not always called out in particular, the elements in the graphic display are in all cases connected with one another via piping connection elements.

It will be understood that display boxes 140, which may be generated as properties of the display elements themselves or which may be separate elements in the form of transmitter and estimated property elements or elements that reference blocks in control modules, are illustrated in the graphic display 100 to indicate or expose parameters, such as process variable (PV) values, setpoint (SP) values, OUT values, etc. associated with the different elements. Additionally, if the user were to place a cursor over some of the elements, the display 100 may illustrate other values associated with the referenced elements. For example, placing the cursor over one of the stream elements (such as the Acetic Acid stream output 136), may cause the graphic to indicate the composition, pressure, temperature, density, flow rate, etc. of the acid stream at this point in the process. Of course, the values and parameters displayed on the graphic display 100 may be delivered from an actual referenced transmitter within the process control system (such as from an AI block in the control system), or from a process module simulation element that simulates the functionality of the element. The graphic display 100 of FIG. 4 may be provided to a user during operation of the process which makes white vinegar or to implement a simulation of that process to be used, for example, to perform design or operator training activities.

Figure 5:
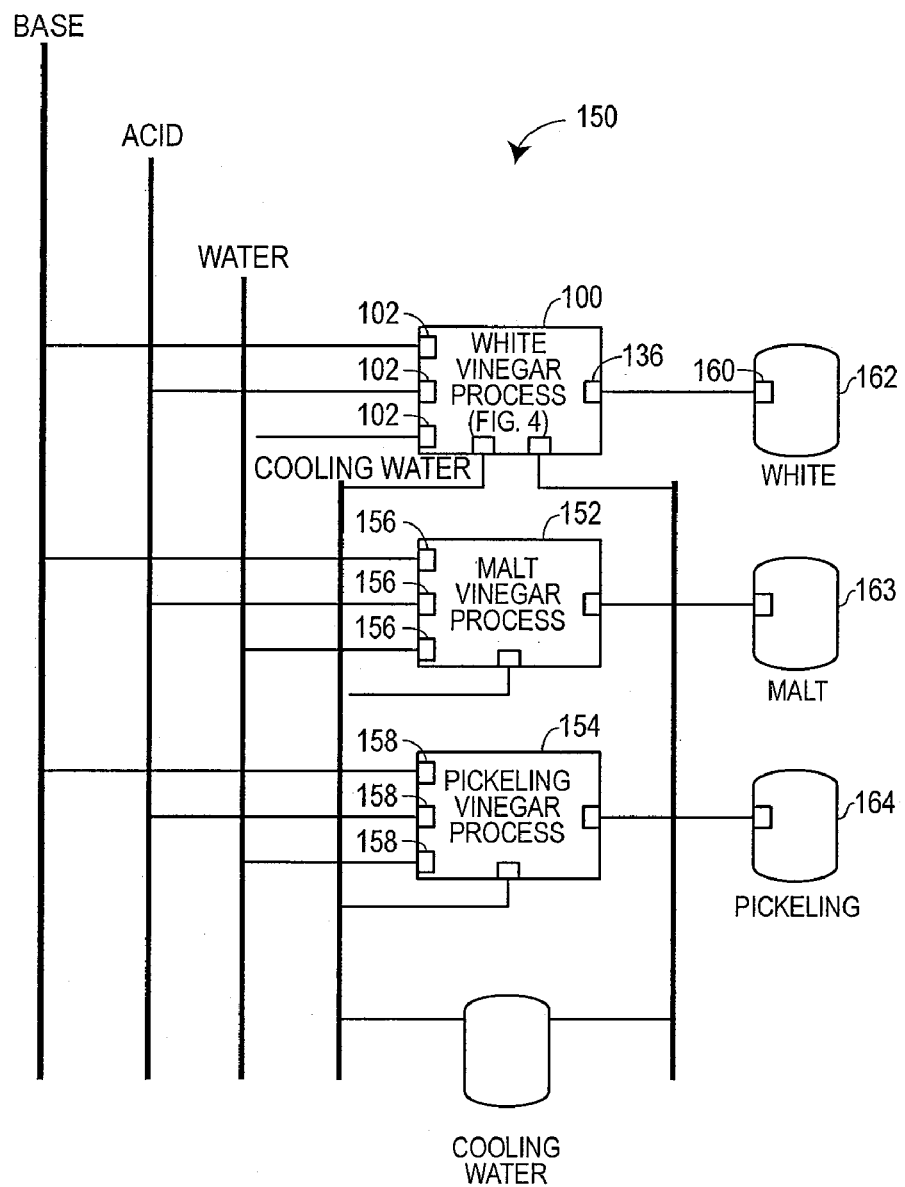
FIG. 5 is a depiction of a set of minimized process graphic displays, including the process graphic display of FIG. 4, interconnected into a larger graphic display for the plant.

FIG. 5 illustrates a manner in which different graphical displays (and similarly, in which different process modules) may be connected together to form higher level displays (or process modules) illustrating (or simulating) more of the process plant. In the display 150 of FIG. 5, the process graphic 100 is collapsed into a box that has a name or label and a set of stream inputs and outputs shown as connection points. If desired, the user may expand the process graphic 100 of FIG. 5 into that shown in FIG. 4 by selecting and, for example, double clicking on that graphic. Additionally, other collapsed graphic displays 152 and 154 are illustrated as being connected to the base feed, acid feed and water feed, as well as to the cooling water feed via input stream elements 156 and 158. The stream output 136 of the process graphic display 100 is connected to a stream input 160 of a holding tank 162 for white vinegar. In a similar manner, the stream outputs of the process graphic displays 152 and 154 are connected to stream inputs of holding tanks 163 and 164 for malt vinegar and pickeling vinegar, respectively. As will be understood, the process graphics 152 and 154 are configured to provide graphics for portions of the process plant that make malt vinegar and picketing vinegar, respectively, and data and graphic views pertaining to these sections of the process plant may be viewed by expanding these displays.

FIG. 5 illustrates, however, that different graphical sections of the process plant may be connected together via connections between stream elements. In particular, the stream elements may be included in a display to define the starting properties associated with a connection element. Also, stream elements may be used as connection points between displays. For such off-sheet connections between displays, the user may click on the stream to immediately call up the associated display that contains the referenced connection. Thus, generally speaking, the mass/composition of the stream element will normally be used to define the starting properties of a process input, i.e., the starting feedstock composition, etc. or to define a link to a stream connection on another display. Connections may be made on the input or output of the mass/composition stream element. For stream elements, the user may generally configure the name of the stream (which should be unique within the system), the properties of the stream (if there is no reference input or input connection), the mass fraction of the different components of the stream (if the stream is made up of more than one component), the pressure or mass flow, the temperature, the specific heat, the density, the required connection type (pipe, duct, conveyor) and the referenced input stream (if used for accessing a stream on another display). Likewise, an energy stream element may be used to define the starting energy associated with a process input, e.g., the BTU/HR transfer, etc. or to define a link to the energy properties of a stream connection on another display.

While FIG. 5 illustrates the use of streams to interconnect different collapsed graphic displays, the same procedure could be used to interconnect (and to illustrate the interconnection of) different process modules. In particular, process modules could be collapsed to illustrate a name and stream element inputs and outputs and these collapsed process modules could be communicatively tied or connected to other process modules using depictions of communication connections or links between the stream outputs and the stream inputs of different process modules.

Figure 6:
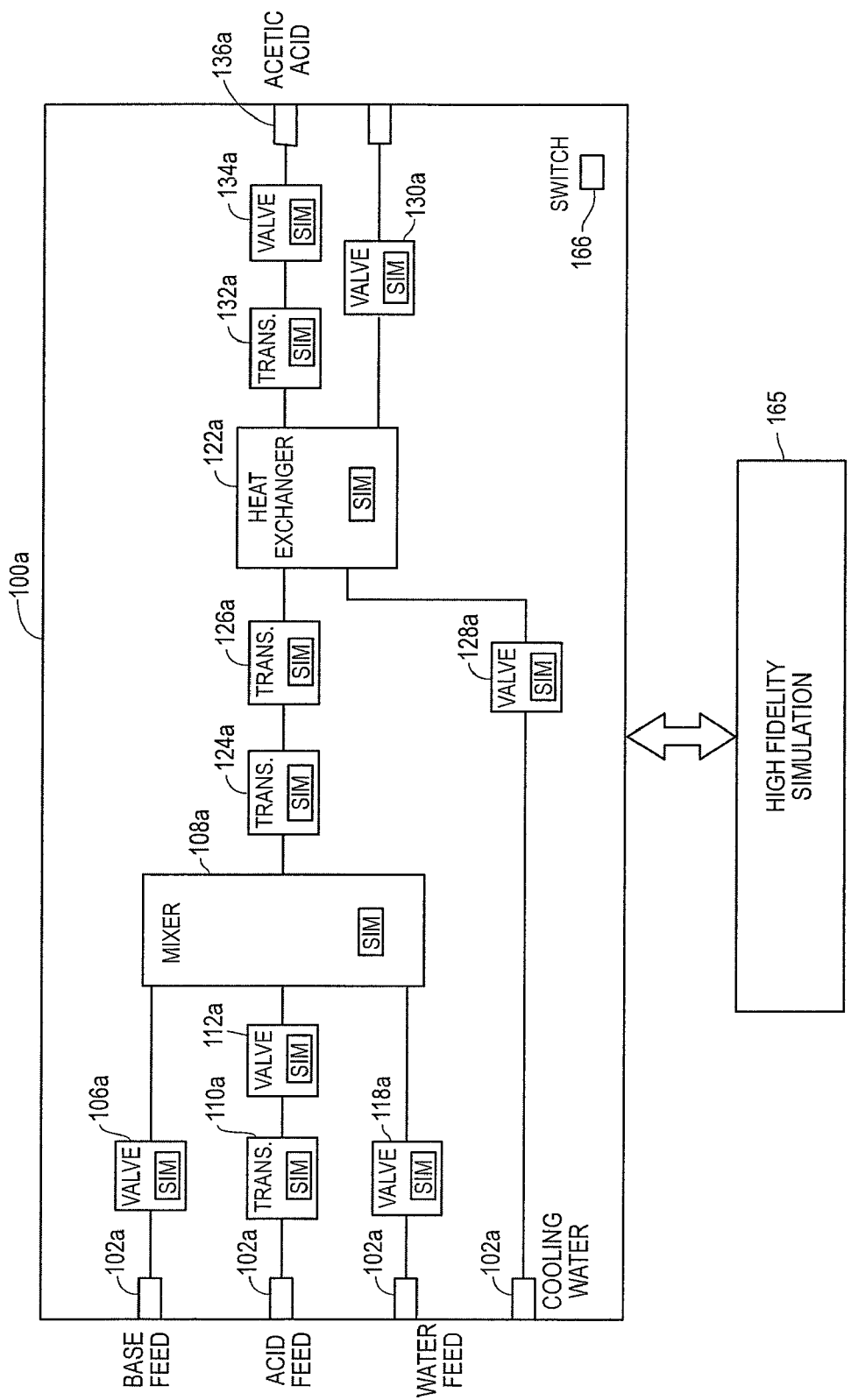
FIG. 6 is depiction of a process module associated with the process graphic display of FIG. 4, also illustrating the interconnection of a high fidelity simulation routine therewith.

FIG. 6 illustrates a process module 100a which corresponds to the graphic display 100 of FIG. 4. As will be seen, the process module 100a includes blocks that represent smart object simulations for each of the physical elements depicted in the graphic display of FIG. 4. For ease of understanding, each simulation block in FIG. 6 corresponding to an element in FIG. 4 is designated with the same reference number with an "a" added. Thus, the mixer simulation block 108a of FIG. 6 is a simulation corresponding to the mixer 108 depicted in FIG. 4. Similarly, the valve simulation blocks 106a, 112a and 118a correspond to and are communicatively tied to the valves 106, 112 and 118, respectively, depicted in FIG. 4.

The process module 100a of FIG. 6 thus includes a process simulation element (which may be represented as a function block associated with or specified by a smart process object) for each element depicted in the graphic display 100 and these simulation blocks are interconnected in the manner and using the connection elements specified in the graphic display 100. If desired, the process module 100a may be created automatically after creation of the graphic display 100 or even during creation of the graphic display 100.

As indicated above, each of the process simulation elements in the process module 100 includes simulation functionality (e.g., an algorithm, rules, transfer function, etc.) that is based on the behavior of the mechanical device used in the process and the nature of the stream(s) of material provided at the inputs to these simulation elements. These simulations are illustrated in FIG. 6 by the SIM blocks within each of the processing, actuator and transmitter elements. The dynamics of the devices and the effects on the streams may thereby be modeled or simulated within the process module 100a. Some possible properties that will be available for simulation blocks associated with actuator and processing elements may be outlet temperature (based on inlet temperature, flows and heat capacity), outlet flows (based on inlet mass flows and accumulation within the element), outlet pressure (based on assumed pressure drop across the unit or downstream pressure) and outlet composition (based on perfect mixing and inlet composition). When custom calculations are implemented, the built-in dynamics associated with the outlet properties may be added based on, for example, a first-order-plus-deadtime response to changes in the process inputs. The user may specify the deadtime and lag associated with each calculated property if desired. For process measurement elements, e.g., transmitters and switches, and connection elements, it may be assumed that no dynamics are introduced in the referenced property. However, transitions and other properties may be modeled if so desired. However, in many cases, the properties from the upstream connection may be immediately reflected in the downstream connection.

Using the process module 100a, the operation of the portion of the plant depicted in the process graphic 100 can be simulated. This simulation is integrated with the display 100 as values from the simulation elements within the process module 100a may be automatically communicated to and displayed in the graphics of the graphic display 100 and used in the control module. Similarly, the training instructor may use the display to effect or change properties in the simulation performed by the process module 100a.

If desired, a high fidelity simulation, such a one provided by HYSYS, CAPE, etc., may be added to the simulation features by defining I/O references for measurement and actuator elements and then using these references to automatically create the DCS interface table that is currently used in for example, HYSYS to perform I/O in a simulation. Standard processing element templates may be defined for each HYSYS (or other high fidelity simulation) component that may used to construct a high fidelity process simulation. Such a high fidelity simulation 165 is illustrated in FIG. 6 as being communicatively connected to the process module 100a In this case, the user may select to disable the simulation provided in each of the simulation elements in the process module 100a and, instead, use the simulation parameters provided by the high fidelity simulation 165. The user may specify the use of the high fidelity simulation 165 by activating a switch 166 (which may be an electronic switch, a flag, etc. set within the process module 100a).

Generally speaking, when the switch 166 is set to use the high fidelity simulation 165, the associated simulation function blocks in the process module 100a act as shadow blocks, i.e., their simulation algorithm (SIM block) is not executed and the block parameters are instead read and written by the high fidelity simulation 165. However, the blocks in the process module 100a still communicate the same parameters and other information to the process graphic and control module and receive information from the process graphic 100 (ultimately for use in the high fidelity simulation 165) and control module 29.

As will be understood, the use of the process module in this manner provides an easy and convenient manner of connecting a high fidelity simulation package (software product) within a process plant in a manner that can be viewed and used by an operator, engineer, etc. (i.e., using the process graphic display 100 associated with the process module 100a). In particular, the stream parameters of the process modules may be connected up to or associated with flows modeled in the high fidelity simulation and pathing within the process module can be automatically structured or associated with the pathing within the high fidelity simulation. In effect, the process modules are used, in this case, as variable or data place holders that provide a convenient manner of mapping data within the high fidelity simulation package to the control modules and the graphic displays used in the process plant control and simulation environment.

Still further, the process modules and associated graphic displays reduce or eliminate the need to provide a separate display for the high fidelity simulation, which is typically currently produced by the high fidelity simulation provider at high cost to the user. Instead, because the process modules are already tied to graphic displays, when the process modules are connected to a high fidelity simulation package, the graphic displays may be used to provide information as calculated by the high fidelity simulation package to the user and to enable the user or operator to manipulate inputs to the high fidelity simulation package. Still further, because the process modules are communicatively connected to the control modules, the parameters or data generated by the high fidelity simulation package may be used in the control modules to perform on-line control activities. Using the process modules in this manner, a high fidelity simulation package can be executed in parallel to, in addition to being integrated with, the control modules.

As will be understood from the discussion provided above, the process modules and graphic displays may be created and run in an integrated manner to provide an operator view of a section of the process plant 10 along with a process module that simulates the operation of the process plant depicted by the graphic display. Advantageously, the process module and the graphic display may additionally be integrated with (e.g., communicatively connected with) one or more control modules that perform control activities with respect to that section or portion of the process plant. Thus, the control modules 29 illustrated in FIG. 1 may be communicatively integrated with one or more of the process modules 39 and graphic displays 35 illustrated in FIG. 1. Of course, the control modules 29, the process modules 39, and the graphic displays 35 may be implemented in any other computers or devices within the plant 10, as desired or necessary in any particular case, other than those illustrated in FIG. 1.

Figure 7A:
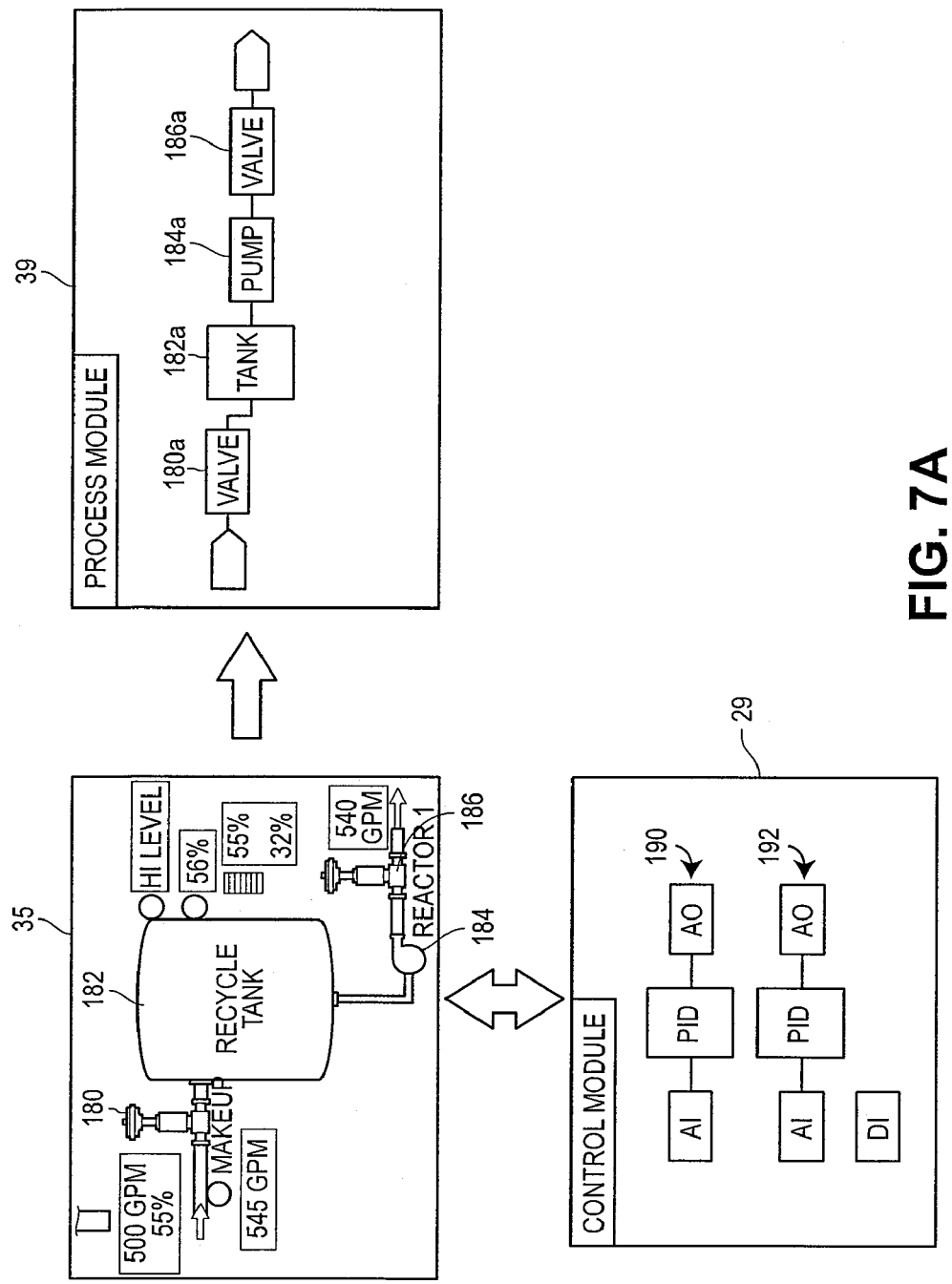
FIGS. 7A and 7B are logical block diagrams illustrating the communication interconnections between a graphic display, a process module and a control module as integrated within a process plant.
Figure 7B:
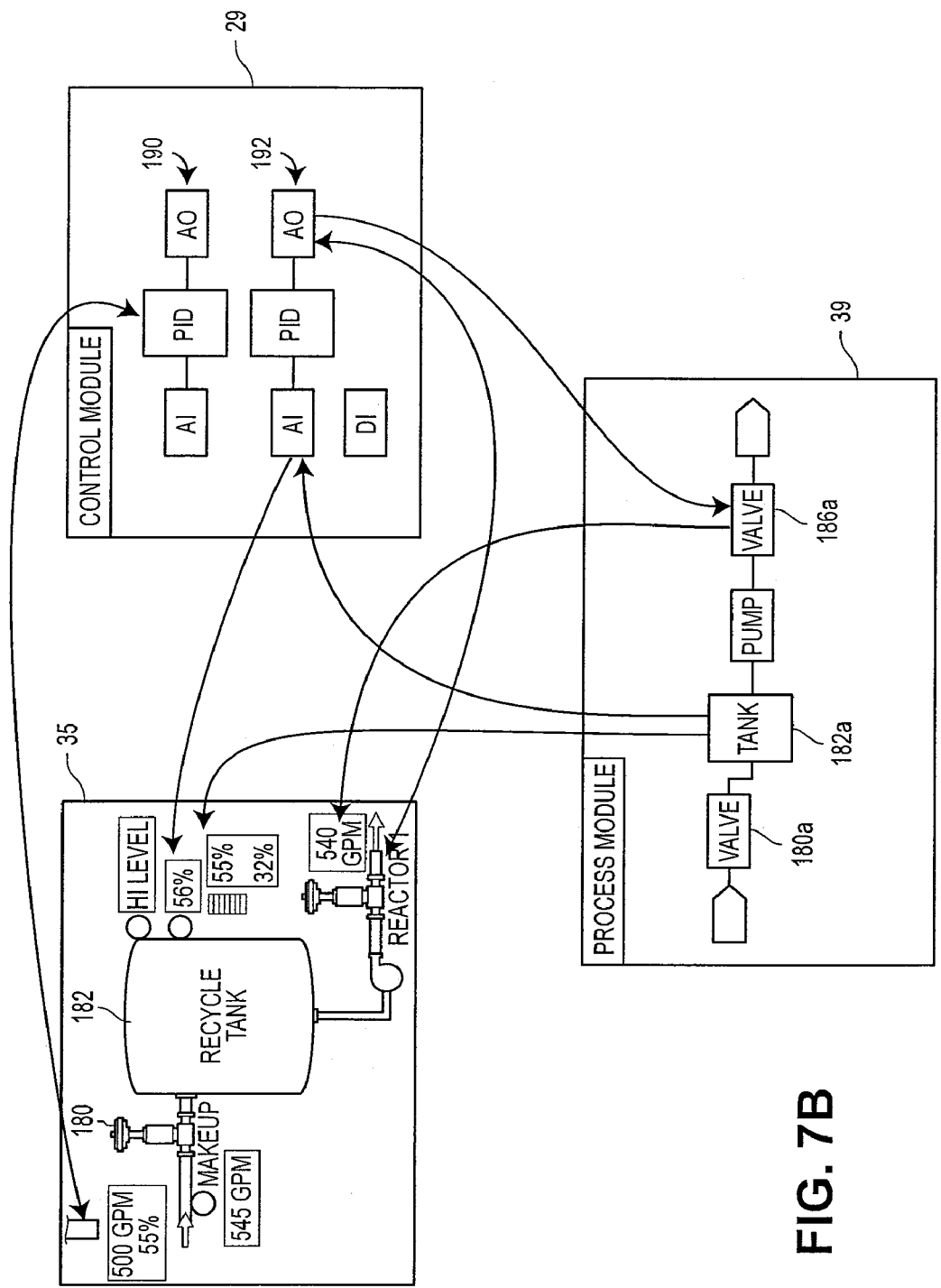

FIGS. 7A and 7B illustrate the integration of a control module 29, a process module 39 and a graphic display 35 in more detail. In particular, the graphic display 35 includes a valve 180 connected to an input of a recycle tank 182 and a pump 184 along with a valve 186 connected in series with an output of the recycle tank 182. The elements 180-186 are connected together via piping connection elements (not labeled) and stream elements are provided at the inputs and outputs of the graphic display 35 to define the streams of materials at those points.

As a result of the configuration of the graphic display 35, the process module 39, which may be created at the same time as the graphic display 35 includes process simulation elements in the form of a valve element 180a, a tank element 182a, a pump element 184a and a valve element 186a corresponding to the physical elements depicted in the graphic display 35. The control module 29, which controls at least some of the physical elements associated with (depicted in) the graphic display 35 includes a set of interconnected function blocks which provide control within or associated with the elements depicted by the graphic display 35 and by the process module 39. In this example, the control module 29 includes two control loops 190 and 192. The first control loop 190 has an analog input (AI) function block that receives flow input information about the flow of fluid into the tank 182, a proportional-integral-derivative (PID) control function block that performs PID control and an analog output (AO) function block that operates the valve 180 to effect the desired flow of material into the tank 182. In a similar manner, the control loop 192 includes an AI function block that provides tank level information as measured by a level sensor within the tank 182, a PID control block and an AO function block that receives a control signal from the PID control block to operate the valve 186 to effect control of the level of fluid within the tank 182. The control module 29 also includes a discrete input (DI) function block that indicates, for example, the on/off state or operation of the pump 184 and which may be used by the control loops 190 and 192 if so desired to perform control activities with respect to the tank 182.

As will be understood, any of the elements within any of the graphic display 35, the process module 39 and the control module 29 may communicate with others of those elements (via associated communication tags) to provide information back and forth between these different entities to thereby provide for better or enhanced control, simulation and operator displays, as will be explained in more detail. For example, as illustrated in FIG. 7B, the PID control block of the loop 190 may be configured to provide information to the graphic display 35 to display the current flow setpoint being used by the PID control element or may read the setpoint to be used in the control module 29 from the graphic display 35, as indicated by the arrowed lines between these elements. In a similar manner, the tank element 182a of the process module 39 may provide a simulation output to the AI function block of the control loop 192 of the process control module 29 indicating the simulated level of the tank, as determined by the simulation algorithm within the element 182a. This simulated tank level may also be illustrated on the graphic display 29 as additional information for viewing by the operator.

If desired, the AO block of the control loop 192 may provide information to and receive information from the valve 186 of the graphic display 35. Additionally, the AO function block of the loop 192 can be configured to provide its control output to the valve element 186a of the process module 39. In this case, the valve element 186a may compare a predicted value for the valve position with an actual valve position being measured in the control loop 192 to determine if there may be some malfunction in the physical element. In the case of a difference over a certain amount, the process module 39 may include software that generates an alarm or an alert on the graphic display 35 that indicates a potential problem within the process plant, such as a faulty sensor, etc. As also illustrated in FIG. 7B, the valve element 186a may provide a simulated measurement or parameter to the graphic display 35 to be displayed or made available to the operator. Such a simulated measurement or parameter may indicate a simulated or predicted flow from the valve 186 or any other simulated parameter associated with the valve 186. Of course, any other desired information or data, including actual measured data, simulated data, or graphic display data may be provided to elements in the graphic display 35, the process module 39 and the control module 29 to provide for better or enhanced control, simulation or display.

Generally speaking, there are numerous advantages that may result by integrating a process module with a control module and, if desired, additionally with a graphic display. In one case, as mentioned above, the simulation performed by the process module may compare a simulated or predicted measurement, parameter or other process value with a measured or calculated parameter provided by the control module to detect potential problems within the system. For example, a great difference between the flow out of the valve as calculated by the process module 39 and as measured within the process itself may be a reason to generate an alarm indicating some device problem exists. Conversely, the control module 29 may use a simulated parameter to provide enhanced control in a situation in which the control module 29 knows of a faulty sensor or other element that is no longer active or available to the control module. In this case, the control module 29 can automatically replace a measured value or parameter (which may be known to be faulty, which may have a bad status, etc.) with a simulated output, as developed by the process module, without needing operator involvement and without having to shut the process down. Optionally, the control module 29 can monitor the amount of time that the measured value or parameter has been replaced by the simulated value and can stop using the simulated value after a particular amount of time. For example, the control module could begin using the faulty value or parameter after the particular amount of time. Also, displaying both simulated and actual control data on the same display may help the operator or user detect problems within the plant, useful in a simulation mode, useful to perform better design activities, etc.

Figure 8:
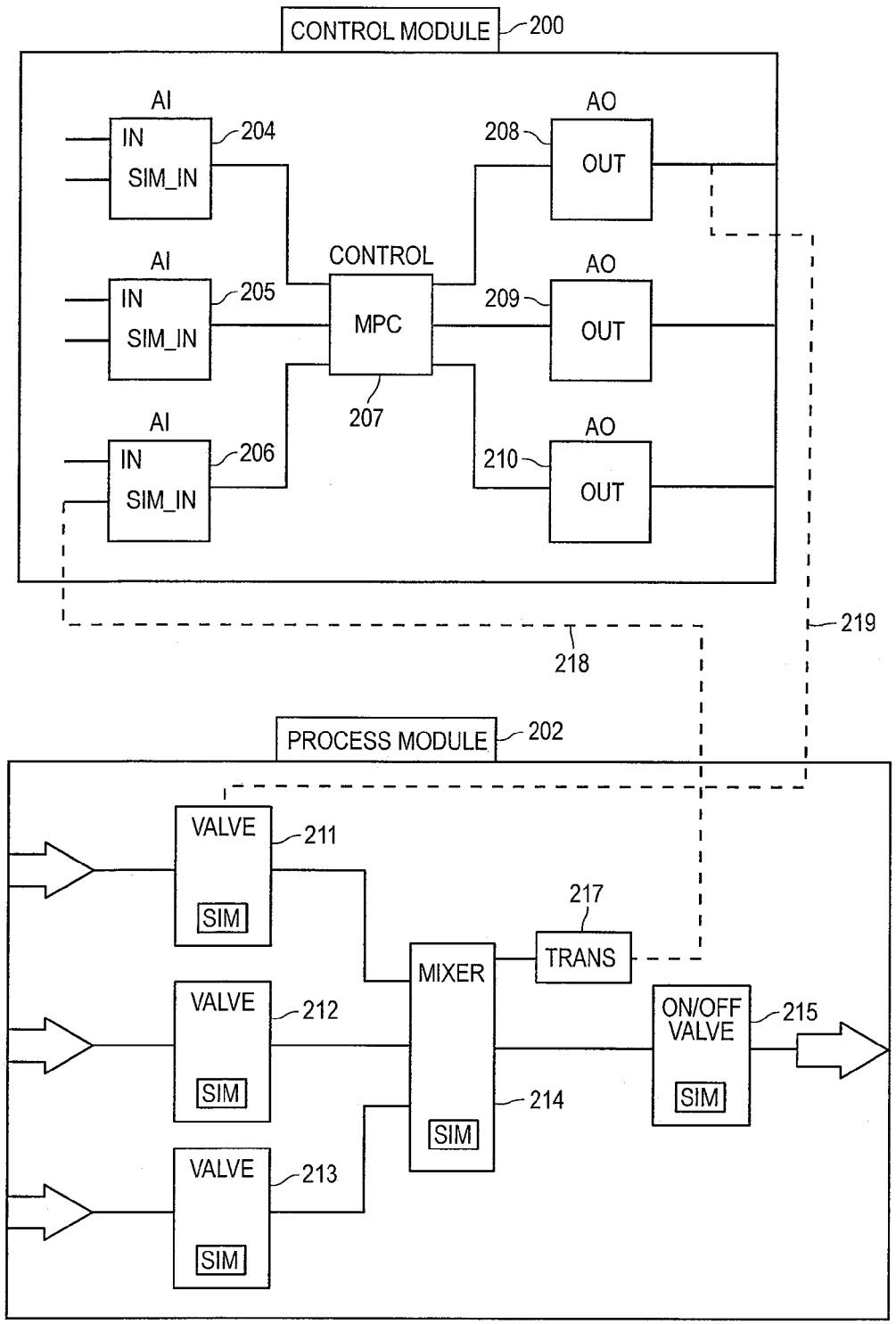
FIG. 8 is a simplified depiction of an example process module having blocks thereof interconnected with function blocks within a control module to provide advanced control and simulation capabilities.

FIG. 8 is a more detailed diagram of a manner in which a control module 200 may be communicatively integrated with a process module 202 (and thereby any graphic display associated with the process module 202). The control module 200 of FIG. 8 includes three AI function blocks 204, 205 and 206 having outputs thereof connected to a control function block 207, which may be, for example, a multiple-input/multiple-output control block, such as a model predictive control (MPC) function block. Three control outputs from the control block 207 are delivered to control inputs of three AO function blocks 208, 209 and 210 which may control, for example valves within a process that provide different fluids to a mixer for mixing.

The process module 202 is associated with the portion of the process having the mixer and valves controlled by the control module 200. In particular, the process module 202 has valves (actuator elements) 211,212, and 213 which simulate the flow of three streams (depicted by arrows at the left hand side of the process module 202) into a mixer element 214. A valve element 215 simulates the flow of fluid out of the mixer element 214 to define an output stream on the right hand side of the process module 202 and a transmitter element 217 may indicate (or simulate) the measured composition of fluid exiting the mixer element 214. It will be rioted that the connection elements, for the sake of clarity, are illustrated as simple lines in the process module 202.

In this case, the AO function blocks 208-210 may control the operation of the valves in the process plant depicted by the valves 211-213 (in the process module 202) while the control inputs to the AI function blocks 204-206 may be provided by a composition sensor, a flow sensor or other sensor in the process plant that is depicted by the transmitter 217 (in the process module 202).

As will be seen, logical elements within the process module 202 and the control module 200 may be communicatively interconnected to provide information from the process module 202 to the control module 200 and vice versa in desired or useful manners. In one example, a communication connection (illustrated by the dotted line 218) may be configured between the output of the transmitter element 217 of the process module 202 (which exposes the simulated measurement of the material composition in the mixer 214) and a simulated input SIM_IN of the AI block 216 in the process control module 200. In this manner, the simulated measurement of the level of fluid in the mixer 214 is provided to the AI block 206, and the AI block 206 may use this simulated input when, for example, the signal at the control input (IN) of that block has a bad status or is known to be faulty for some reason. In this manner, the AI block 206 may still provide an approximated value of the measurement associated with the AI block 206 when the actual physical measurement is not valid or not available, thereby enabling the control module 200 to continue to function and provide control in the presence of a faulty sensor. Such a connection may also enable the control module 200 to run in a simulated mode in which valid simulation data (as provided by the simulation process module 202) is used during off-line operator training or to test the control module 200.

Alternatively, or in addition, a communication connection (illustrated by the dotted line 219) may be configured between the output of the AO block 208 in the process control module 200 and an input of the valve element 211 which models the actual valve being controlled by the AO block 208 in the process plant. Here, the valve element 211 may use data obtained from the actual valve or sent to the actual valve to determine whether the simulated data (i.e., the measurements and parameters calculated by SIM block of the valve element 211) is correct or matches with the data used in the actual control routine 200. If there is a significant difference, the process module 202 may generate an alarm or alert indicating a potential problem or may use the real data to provide better or more accurate simulation within the process module 202. For example, the valve element 211 may use the actual control data in the SIM block for the position of the valve element 211 to reflect the actual valve position in the simulation. Of course, other connections between the elements in the process module 202 and the control module 200 may be made to provide data flow in either direction between these two modules for performing enhanced control and/or simulation. Still further, any of the data from the process module 202 or the control module 200 may be automatically made available to the operator via a graphic display associated with the process module 202.

If desired, the process modules may provide and simulate redundancy functions within a process control network or a process plant. In particular, the process modules may simulate the operation of actual redundant elements, such as redundant devices, redundant control blocks, etc. disposed within the process plant and be able to detect or simulate the operation of actual redundant elements (including, for example, when the back-up redundant element should take over, etc.) Additionally, if desired, a process module with its simulation capabilities may be used as one of a redundant pair of elements within a process plant. In this case, the process module (or any portion thereof) may operate as a back-up device providing back-up or redundant data (signals, calculations, etc.) in case of a failure of or a detected problem associated with the primary (and actual physical) device. In this case, the process module acting as the redundant element may be communicatively interconnected with the control modules (that perform control or sensing operations) in any known manner to provide the redundant capabilities. This use of process modules as redundant elements within the process plant is particularly useful when the process modules are connected to one or more high fidelity simulation packages in the manner described above.

It will be understood that the functionality of the smart process objects, the graphic display elements and the process modules described herein may operate in the operator workstation 20 and does not need to be downloaded to and configured within the controllers, field devices, etc. within the plant 10, which makes this functionality easier to implement, view, change, etc. Further, this functionality enables system level determinations to be made more easily than within the process devices, controllers, etc. because the information pertaining to the devices on a system level is all typically available to the operator workstation 20 in general and to the execution engine 48 in particular whereas all of this information is not typically made available to each controller and field device within the process plant 10. However, when it is advantageous to do so, some of the logic associated with the process modules, such as primitives, may be embedded in the devices, equipment and controllers down within the process plant. The use of smart process objects to create integrated process control modules and graphic displays enables the execution engine 48 to, for example, automatically detect leaks and produce smart alarms with minimal amounts of user configuration activities, to calculate and track flow and mass balances within the plant 10, to track losses within the plant 10 and to provide higher level diagnostics for the plant 10 and to simulate the operation of the plant during engineering design and operator training.

Figure 9:
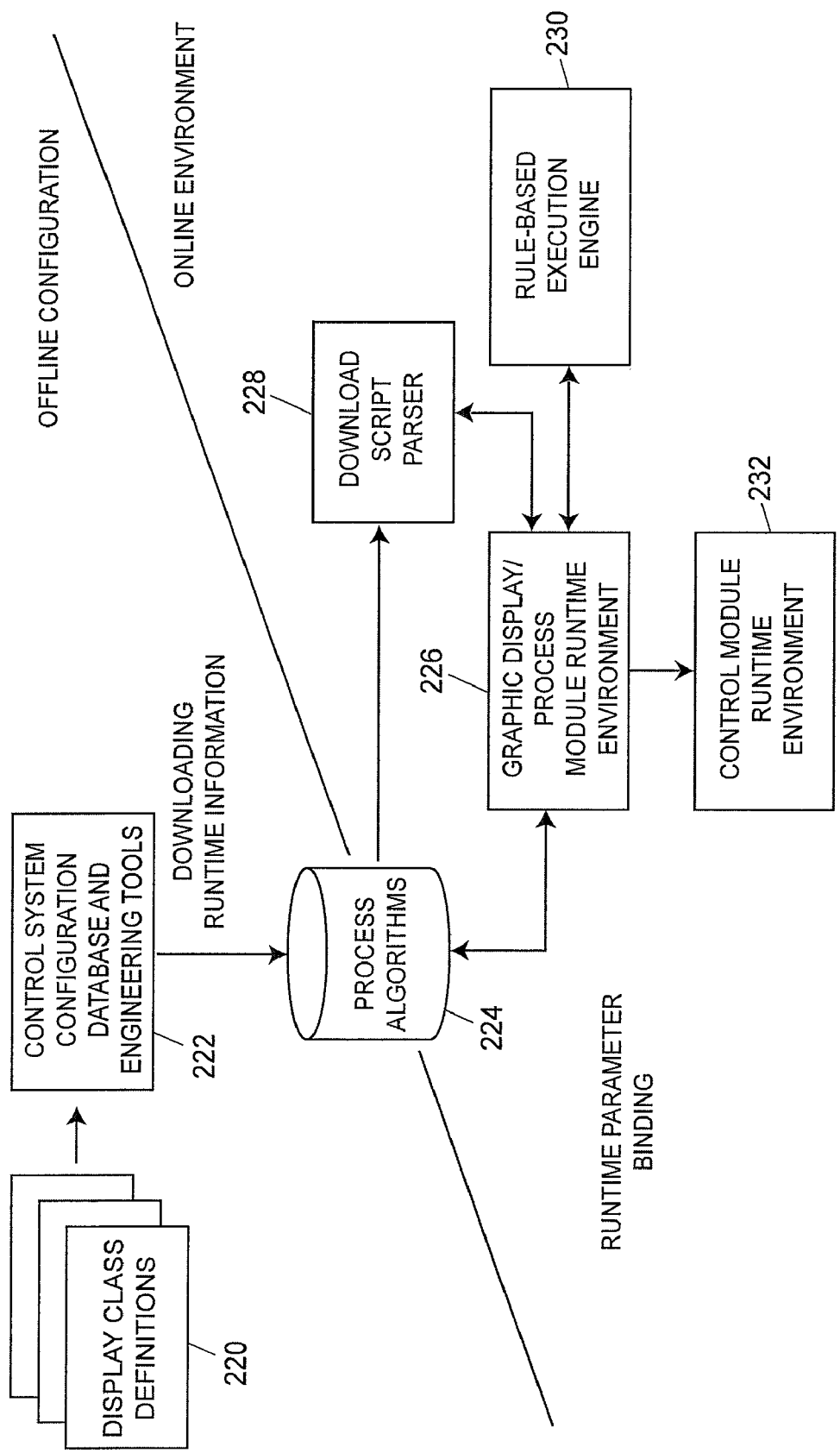
FIG. 9 is a logical block diagram of a manner in which process modules using smart process objects may be created in and implemented within an existing process control network.

FIG. 9 depicts one possible manner of integrating the execution engine 48 and the process modules and graphic displays used thereby within a process plant having a distributed control strategy. As illustrated in FIG. 9, the display class definitions 220 created by or associated with the process modules providing displays to an operator during execution by the execution engine 48 and are provided to the control configuration database and engineering tools 222 which may use and organize these display class definitions in any desired manner within the control strategy documentation. Process algorithms 224 may be connected to these display class definitions prior to runtime and then the display class definitions and flow algorithms bound thereto may be instantiated and provided to the graphic display/process module runtime environment 226 (which may be implemented in the form of one or more execution engines 48 in one or more workstations). The graphic display/process module runtime environment 126 uses a download script parser 228 to parse the code during execution (i.e., to perform just in time object code conversion) and uses a ruled-based execution engine 230 to execute flow algorithms or other rule based procedures provided for or bound to the display classes. During this process, the graphic display/process module runtime environment 226 may communicate with the control module runtime environment 232, which may be executed in controllers and field devices associated with the process, to provide data or information to the control module runtime environment 232 or to access data or other information from the control module runtime environment 232. Of course, the graphic display/process module runtime environment 226 may communicate with the control module runtime environment 232 using any desired or preconfigured communication networks, such as the Ethernet bus 24 of FIG. 1. Still further, other methods of integrating the graphic displays, process modules and control modules described herein into a standard process control system or process plant may be used as well.

Referring again to FIG. 2, the configuration applications 38 may provide one or more applications for viewing, creating, and/or editing process modules. In one implementation, an initial definition of a process module may be automatically created based on a process graphics design of the process module. Also, process modules may be created or modified using a process module editor. A standard set of process blocks and/or custom process blocks may be used to create a process module that may be used to simulate a portion of a process plant. Process modules may be used in off-line simulation for operator training, for example. Also, portions of a process simulation created with process modules may be used in an on-line system to show properties, future values and performance data that may be calculated as part of a process simulation.

FIGS. 10-13 depict example screen displays that may be created by the configuration applications 38 of FIG. 2 during the process of a configuration engineer, for example, creating and/or using process modules 39 and/or graphic displays 35. As will be understood, the screen displays in FIGS. 10-13 include an explorer view on the left-hand side of the screen, which may provide, for example, an organizational tree structure depicting the configuration of the process plant 10 and/or an organizational tree structure depicting elements that may be used to configure the process plant and/or simulate operation of portions of the process plant. Likewise, the screen displays of FIGS. 10-13 include one or more information views on the right-hand side thereof These information views provide further information about selected ones of the elements in the explorer view.

Figure 10:
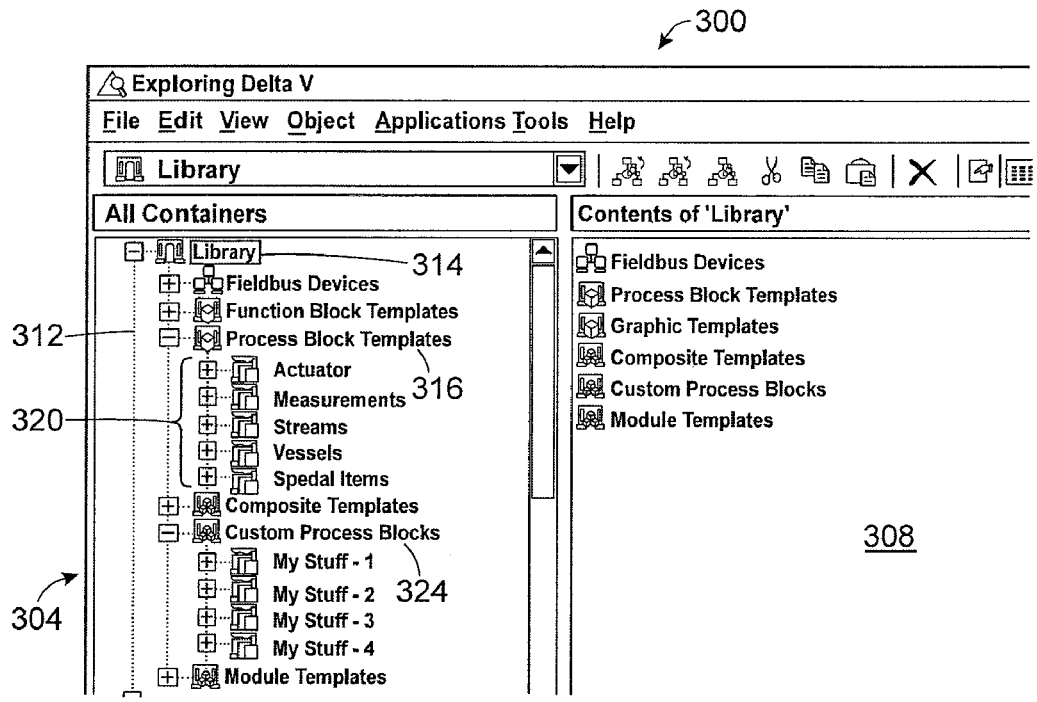
FIG. 10 is a portion of an example display that can be used to access process objects in a library.

A number of standard process objects, such as smart process objects and/or non-smart process objects, may be provided to assist in the creation of process modules. Also, custom process objects may be created for an end-user or a category of end-users (e.g., refineries). Similarly, an end user may create user-defined process objects (special process objects) that similarly may be used to create process modules. Standard process objects, custom process objects, and/or special process objects may be stored in a library for use in creating process modules. A user may browse the library to view available process objects, and may be able to select a process object to view information about the process object, to edit the process object, etc. FIG. 10 is a portion of an example display 300 having an explorer portion 304 and an informational portion 308 that can be used to access process objects in a library. The explorer portion 304 includes a tree structure 312 having a library folder 314. The library folder 314 includes a process block template folder 316 that includes a plurality of sub-folders 320 that may correspond to different categories of process objects, for example, that are provided to assist in the creation of process modules. Additionally, the library folder 314 may include a custom process blocks folder 324, that may itself include a plurality of sub-folder for storing process objects designed by an end user of the configuration applications 38, for example.

If a user selects a category, for example, in the explore portion 304, contents of the selected category may be shown in the informational portion 308. Similarly, if the user selects a process block, for example, in the explore portion 304, information regarding the selected process block may be shown in the informational portion 308.

Figure 11:
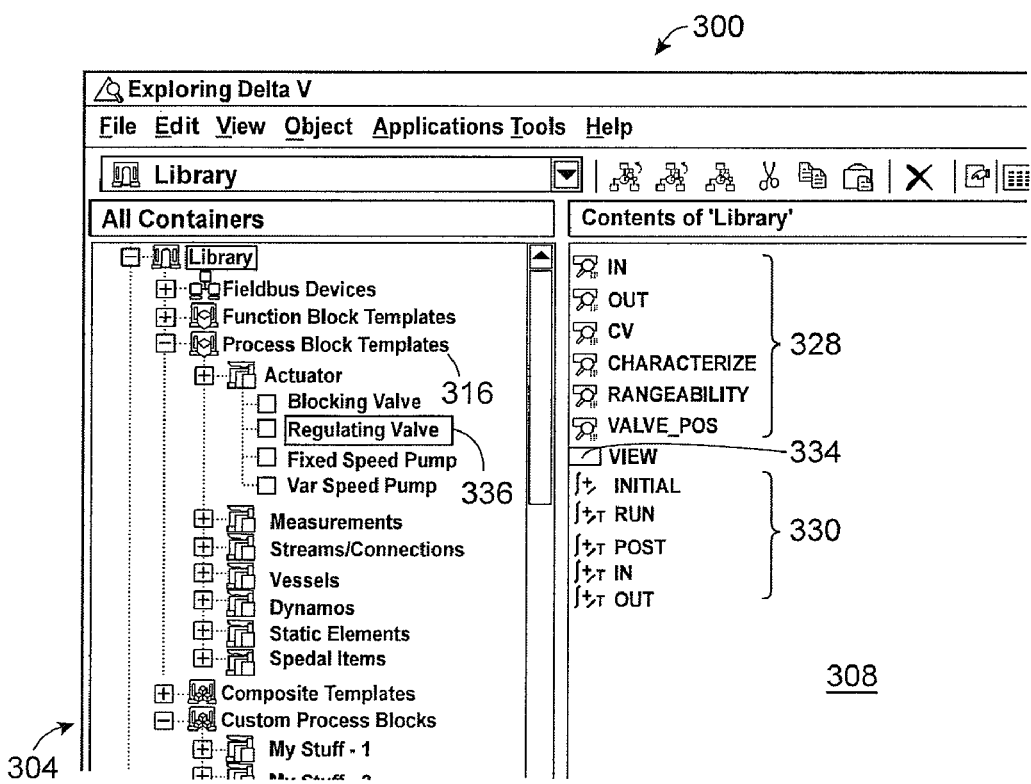
FIG. 11 is the example display of FIG. 10 in which an item in a left-hand portion of the display has been selected.

FIG. 11 is a portion of the example display 300 in which an item 326 in the process block template folder 316 has been selected via, for example, a mouse, a touchscreen, a stylus, a touchpad, a keyboard, etc. The informational portion 308 displays parameters 328 and one or more simulation algorithms 330 for the selected process block item 326. Also, the informational portion 308 may display one or more 3-D dynamic dynamos 334 that were previously created for viewing the process block.

More or less information could optionally be shown in informational portion 308. For example, the display 300 may permit a more detailed view in which additional information such as default values of parameters 328 may be illustrated. A user may be able to change a default value by selecting the default value and then entering a new value via, for example, a keyboard. Also, a user may be able to launch an application to edit a process block and/or a dynamo associated with the process block by selecting (e.g., "right-clicking" on) the process block or dynamo in the informational portion 308. In response to the selection, a window or display may be displayed to allow a user to edit the process block and/or a dynamo, for example.

Figure 12:
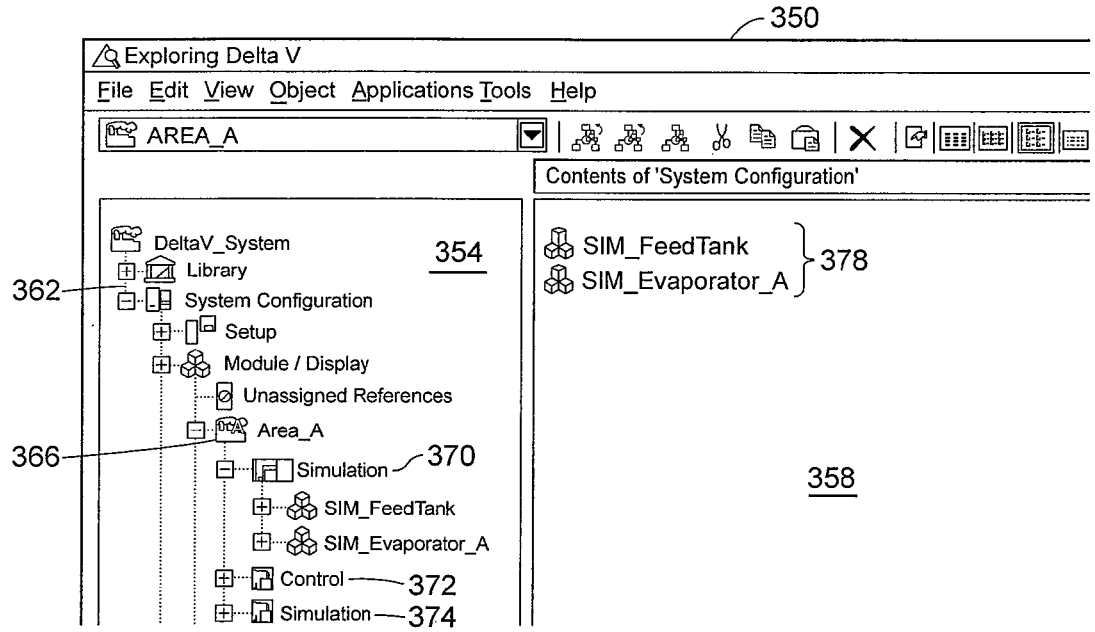
FIG. 12 is a portion of an example display that may be used to browse already created process modules.

A user may wish to browse process modules that have already been created to, for example, view, edit, etc., process modules. FIG. 12 is a portion of an example display 350 having an explorer portion 354 and an informational portion 358 that may be used to browse already created process modules. The explorer portion 354 includes a hierarchical structure 362 that may include folders corresponding to physical and/or logical areas of the process plant 10. For example, the tree structure 363 includes a folder 366 corresponding to an "AREA_A" of the process plant. The folder 366 includes a simulation folder 370, a control folder 372, and a displays folder 374. If, for example, the simulation folder 370 is selected by a user, the process modules 378 available in the folder 370 may be displayed in the informational portion 358. Optionally, the process modules 378 available in the folder 370 may be displayed in the hierarchy 362. A user may be able to launch an application to edit a process modules by, for example, selection (e.g., "right-clicking" on) the process modules in the informational portion 358.

Figure 13:
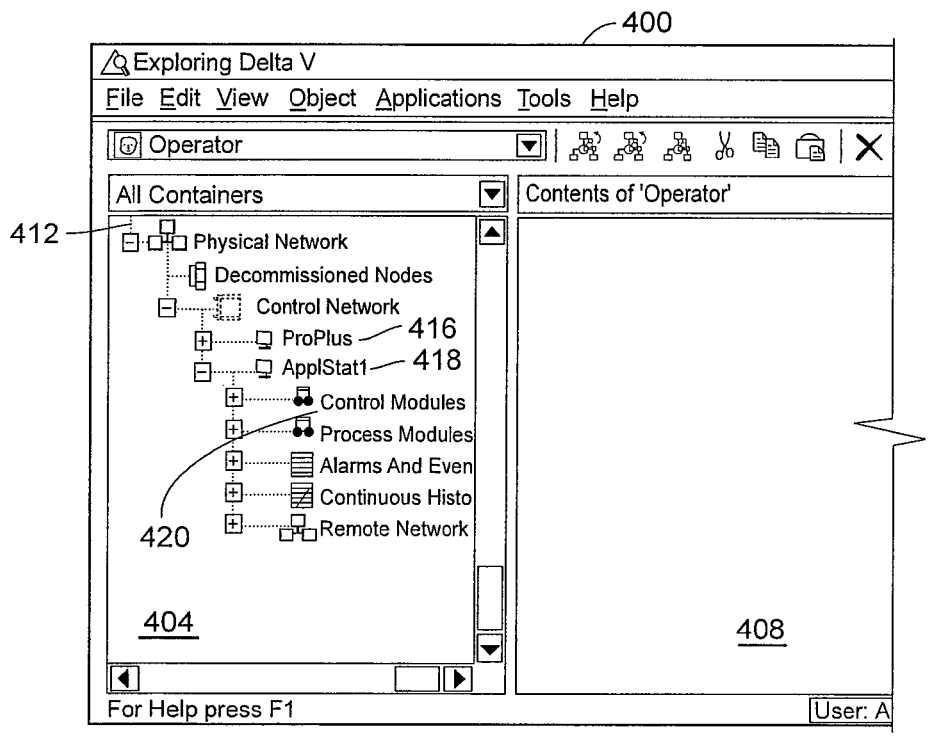
FIG. 13 is a portion of an example display that can be used to assign process modules to be executed by a particular node in a process plant.

FIG. 13 is a portion of an example display 400 that can be used to assign process modules to be executed by a particular node (e.g., a workstation, a controller, etc.) in the process plant 10. The display includes an explorer portion 404 and an informational portion 408. The explorer portion 404 includes a tree structure 412 that may include folders 416 and 418 corresponding to workstations in the process plant 10. The folder 418 includes a process modules folder 420. A process module can be assigned to the node corresponding to the folder 418 by dragging an item corresponding to process module to the folder 420 or, optionally, the folder 418. Referring to FIGS. 12 and 13, as an example, one or both of the items 378 could be dragged to the folder 418 or the folder 420 in order to assign the one or both items 378 to the node corresponding to the folder 418.

Figure 14:
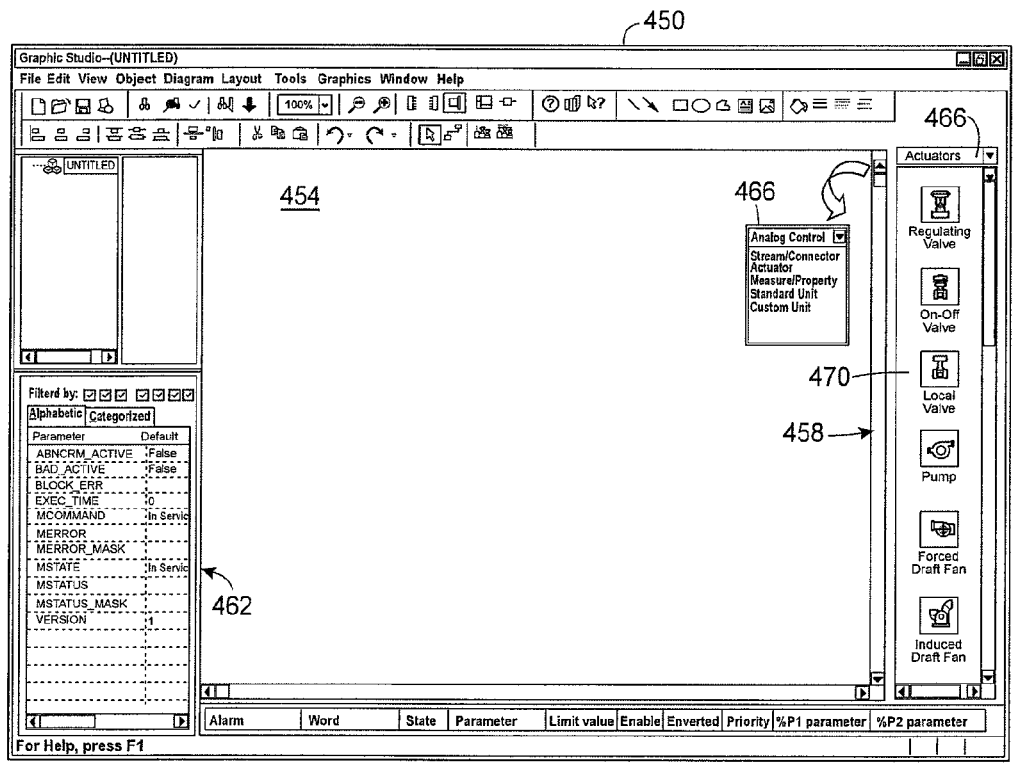
FIG. 14 is an example display associated with an editor for creating and modifying process modules.

FIG. 14 is an example display 450 corresponding to an editor for creating and modifying process modules. The display 450 includes a workspace portion 454, a process block palette portion 458, a parameters portion 462, and toolbars. The display 450 may be used to create new process modules and/or to edit existing process modules. The process block palette portion 458 may include a user interface mechanism 466, such as a pull-down menu, to select one of a plurality of categories of process objects. Process object templates corresponding to the selected process object category may be illustrated in a portion 470. Examples of process object categories may include a category associated with streams and connections, a category associated with actuators, a category associated with standard process units, a category associated with custom process units, a category associated with user defined process units, etc. The user could, for example, drag a process object template from the portion 470 and drop it in the workspace portion 454. When a block representing a process object is selected (e.g., via a mouse click) in the workspace portion 454, parameters corresponding to the selected process object may be shown the in parameters portion 462.

Stream elements may be used to define starting and ending points of a process simulated by a process module. The processing of a gas, liquid or solid steams may be performed by a combination of standard, custom, and special processing blocks, for example, with a regulation of flow between processing object determined by connection and actuator elements, for example. The components used in a simulation may be defined by dragging the appropriate blocks and elements from the palette portion 458 into the work space portion 454. The process flow between processing objects may be defined by using a mouse, for example, to connect inputs and outputs of blocks in a flow path. Properties of the stream may be automatically carried by each connection in a flow path. Examples of properties that may be carried by each connection include one or more (or none) of mass flow, pressure, temperature, density, or specific heat. Also, a connection status may be carried with the property values. Optionally, a user may add composition of the stream. When composition is added to a stream, then this added information will be supported by elements in the flow path.

Figure 15:
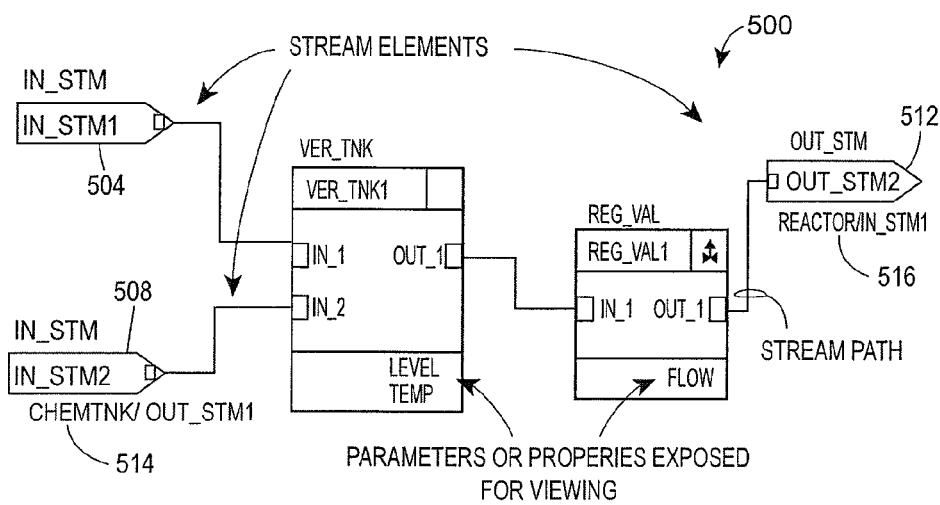
FIG. 15 is an illustration of a process module corresponding to a simple tank.

FIG. 15 is an example of a process module 500 corresponding to a simple tank. The process module 500 could be created using, for example, a display of an editor such as the display 450 of FIG. 14. The process module 500 includes stream elements 504, 508, and 512. Stream elements may be configured to provide a constant process condition (e.g., supply pressure) or they may act as a reference to streams in other modules (e.g., the stream element is used to pass information to another module). The stream element 508 references another module, and an indication 514 of the referenced module/stream is automatically shown below the steam element 508. Similarly, the stream element 512 references another module, and an indication 516 of the referenced module/stream is automatically shown below the steam element 508.

A user may choose to expose certain properties or parameters of an input, output, or an internal calculated value, such as tank level, of an element. The property or parameter name will then be displayed in the corresponding block and the value will be displayed in the workspace beside the property or parameter name during execution of the process module.

Process objects used in simulation may have parameters that correspond to physical properties of associated equipment and/or control modules. Thus, once the stream and process objects have been defined in a process module, parameters of these elements may be configured to match the process and control system requirements. Referring again to FIG. 14, when a process object is selected in the workspace portion 454, configurable parameters of that process object (e.g., cv, height, etc.) may be automatically shown in the parameters portion 462. By selecting (e.g., by double clicking) one of the parameters shown in the parameters portion 462, a dialog display may be provided to allow the associated parameter value to be modified.

Figure 16A:
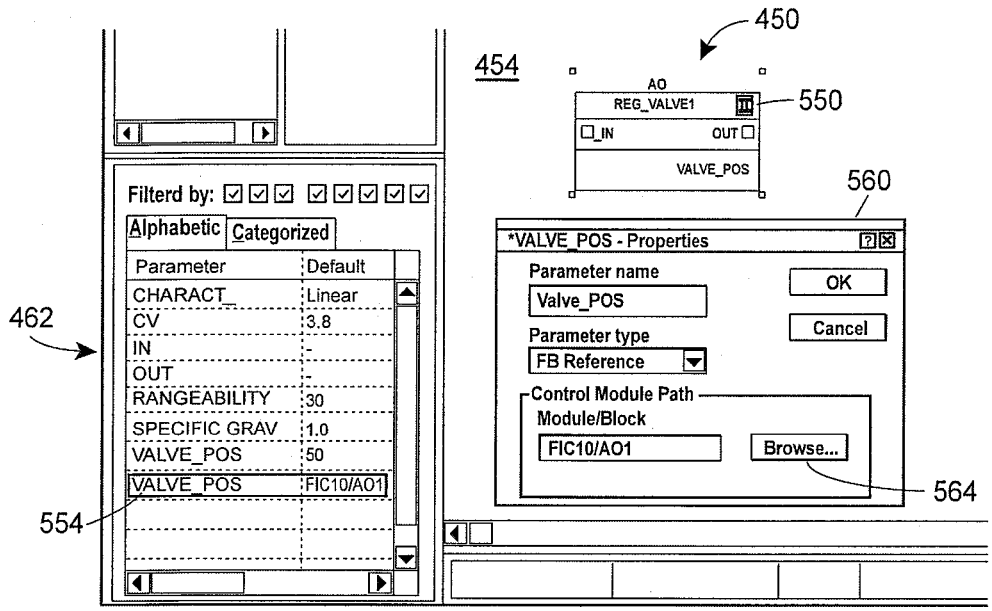
FIG. 16A illustrates an example display associated with modifying a parameter of a process object in a process module.

FIG. 16A is an illustration of the example display 450 of FIG. 14 having a process block 550 representative of a process object placed in the workspace portion 454. The process block 550 has been selected. Thus, parameters corresponding to the process block 550 are displayed in the parameters portion 462. A parameter 554 has been selected in the parameters portion 462. In this scenario, the parameter 554 is a function block reference parameter associated with valve position. As a result of the parameter 554 being selected, a display such as an example display 560 may be displayed to allow the parameter 554 to be modified. For example, the parameter 554 may be modified to associate the parameter with a particular output process object in a particular control or process module. For instance, the display 560 includes a button 564 that may permit a user to select the process object and the control or process module.

Figure 16B:
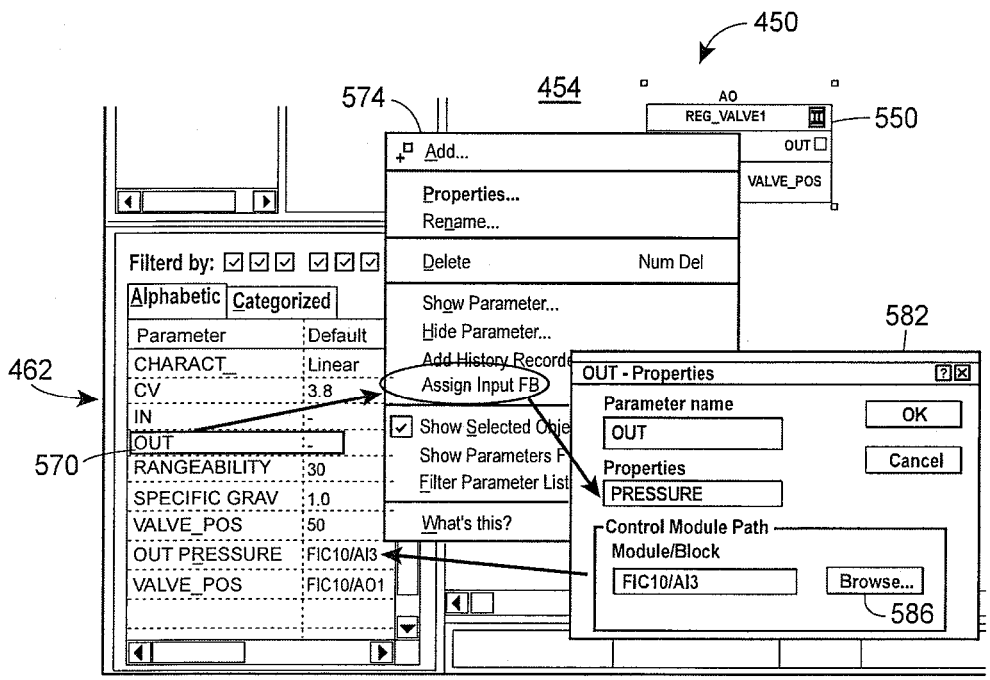
FIG. 16B illustrates an example display for associating a parameter of a process block in a process module with a function block in another module.

FIG. 16B is an illustration of using the example display 450 to add a function block reference parameter to the parameters portion 460. Similar to FIG. 16A, the process block 550 has been selected, and thus, parameters corresponding to the process block 550 are displayed in the parameters portion 462. A parameter 570 has been selected in the parameters portion 462. In this scenario, the user has elected, via a menu 574 to assign a process object in another module to be associated with the parameter 570. A display such as an example display 582 may be displayed to allow the parameter 570 to be referenced to function block in another module. For instance, the display 582 includes a button 586 that may permit a user to select the process object and the control or process module. In response, a function block reference parameter 590 is added to the parameters portion 460.

Process parameters, such as vessel level, that are measured within the control system, can be referenced in the associated process object using a display such as the display 560, for example. In off-line training, this reference may be used to update the simulate parameter of input function blocks, for example. In an on-line system, this reference may be used to access the measured value and to use this measured value to correct for errors in the simulation, for example. Also, if a measurement in the on-line system fails, then an operator may elect to use a simulated value.

If a measurement is standard on a piece of equipment, a process object associated with that equipment may include a reference parameter corresponding to that measurement. When other measurements are available in the control system, one or more of these measurements may be added to a process module. For example, a user could right click on a process block in a process module. The user may then be provided with one or more displays that could be used to select a measurement and, to select an internal parameter or outlet stream property to which the measurement is to be associated. Once this reference is made, then a reference parameter corresponding to the measurement may be automatically displayed in the parameters portion 462 when the process block is selected.

Figure 17:
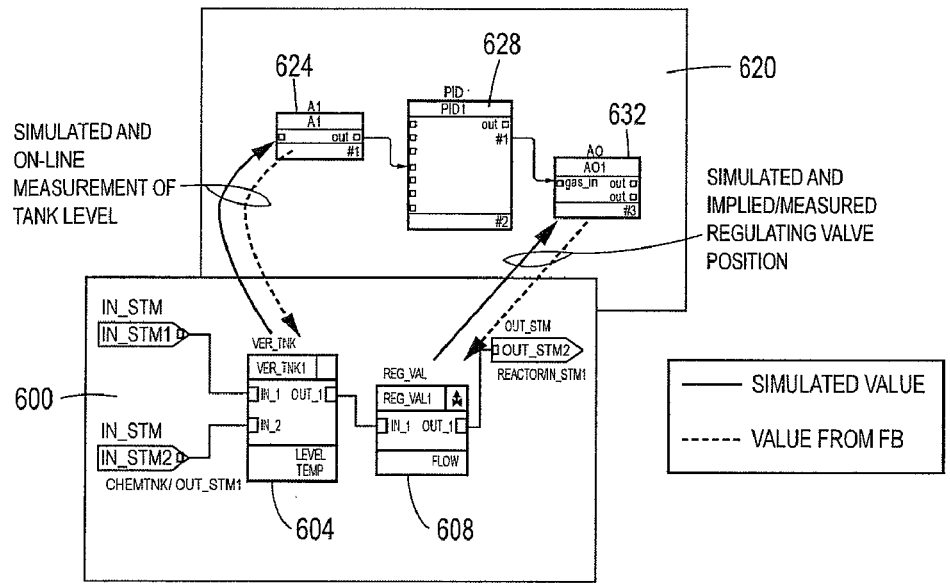
FIG. 17 is an illustration of property, parameter, and/or measurement values being automatically pulled from control modules into a process module.

FIG. 17 illustrates that property, parameter, and/or measurement values may be automatically pulled from control modules into a process module. In addition, simulated property and parameter values that correspond to property, parameter, and/or measurement values may be automatically sent to control modules. For example, a process module 600 may include a process object 604 corresponding to a tank and a process object 608 corresponding to a regulating valve. A control module 620 may include an input block 624 that provides a level measurement of the tank to a PID) control function block 628. An output of the PID control function block 628 may be provided to an output block 632 that corresponds to the regulating valve. The measured tank level may be obtained from the input block 624 and provided to the process object 604. Similarly, the simulated tank level may be obtained from the process object 604 and provided to the input block 624. Also, the measured valve position may be obtained from the output block 632 and provided to the process object 608. Similarly, the simulated valve position may be obtained from the process object 608 and provided to the output block 632.

As discussed above with respect to FIG. 14, an editor for creating and modifying process modules may provide a variety of types of process objects that can be used by a user to create a process module. For example, standard process objects and custom process objects may be provided. A custom process object may include a process object designed for or by an end user according to a set of requirements provided by the end user. A custom process block may be used to simulate complex process equipment, for example, and may use one or more models (e.g., a step response model, a first principles model, etc.) to simulate the behavior of the equipment. For example, a step response model may be used to simulate reactions, less than perfect mixing in a vessel, etc. The custom process object may utilize such models to generate output stream properties/parameters and/or internal properties/parameters associated with internal measurements, for example, for the equipment. Selected properties of one or more input streams may be provided as inputs to the model. The custom process object may generate other parameters/properties based on an assumption that conditions are ideal, for example.

Figure 18:
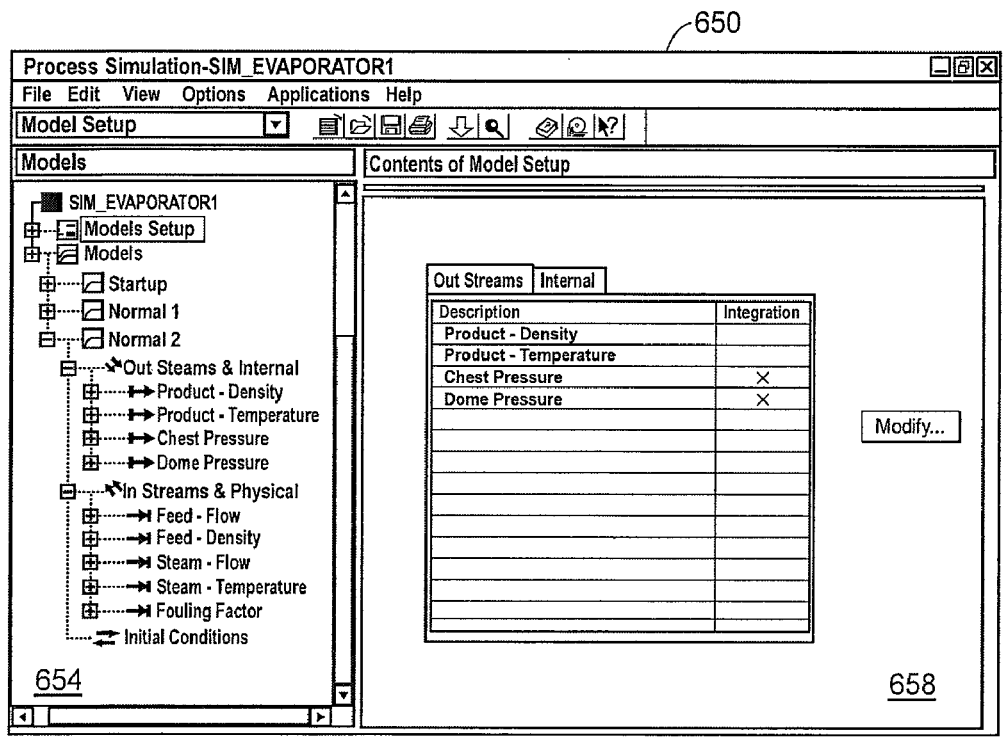
FIG. 18 is an example display for showing models that have been defined for a process object in a process module.

Referring to FIG. 14, an instance of a custom object may be added to a process module by dragging a block from the portion 458 and dropping the block in the workspace portion 454, for example. A dynamic response associated with a custom process object may be viewed and modified. For example, a user could right click on the block representing the custom object and select "Properties" from a menu. Referring now to FIG. 18, a display such as the example display 650 maybe displayed in response. The display 650 shows models defined for the object in a portion 654. A portion 658 indicates whether properties/parameters associated with models are integrating or non-integrating.

Figure 19:
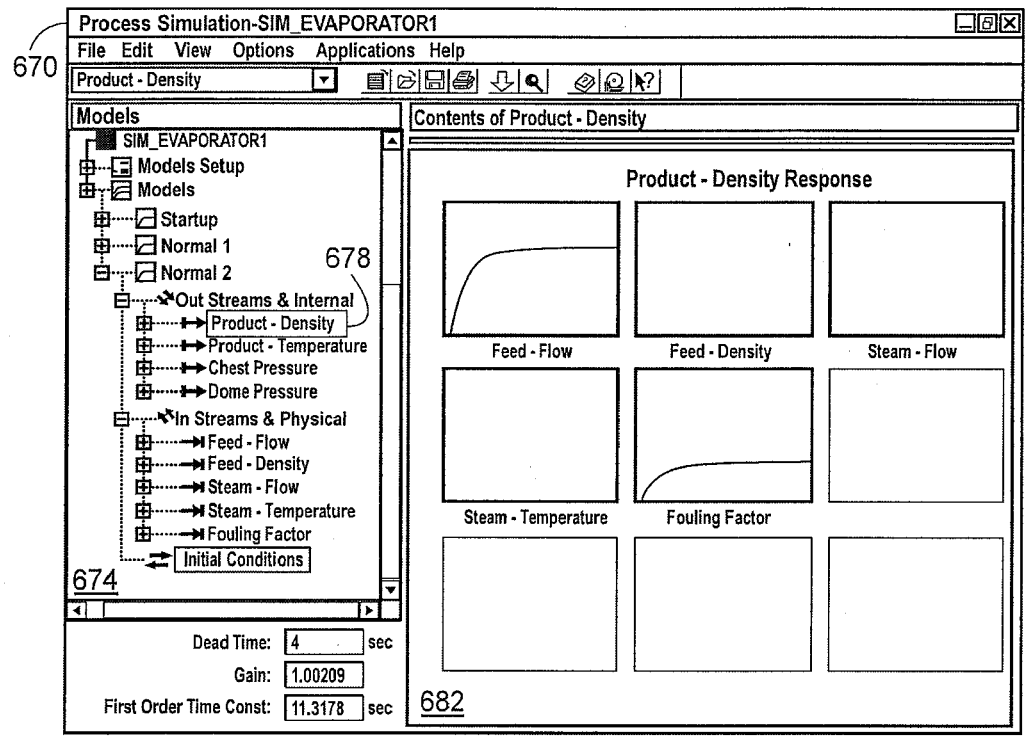
FIG. 19 is an example display for showing step responses associated with different properties/parameters for a selected model.
Figure 20:
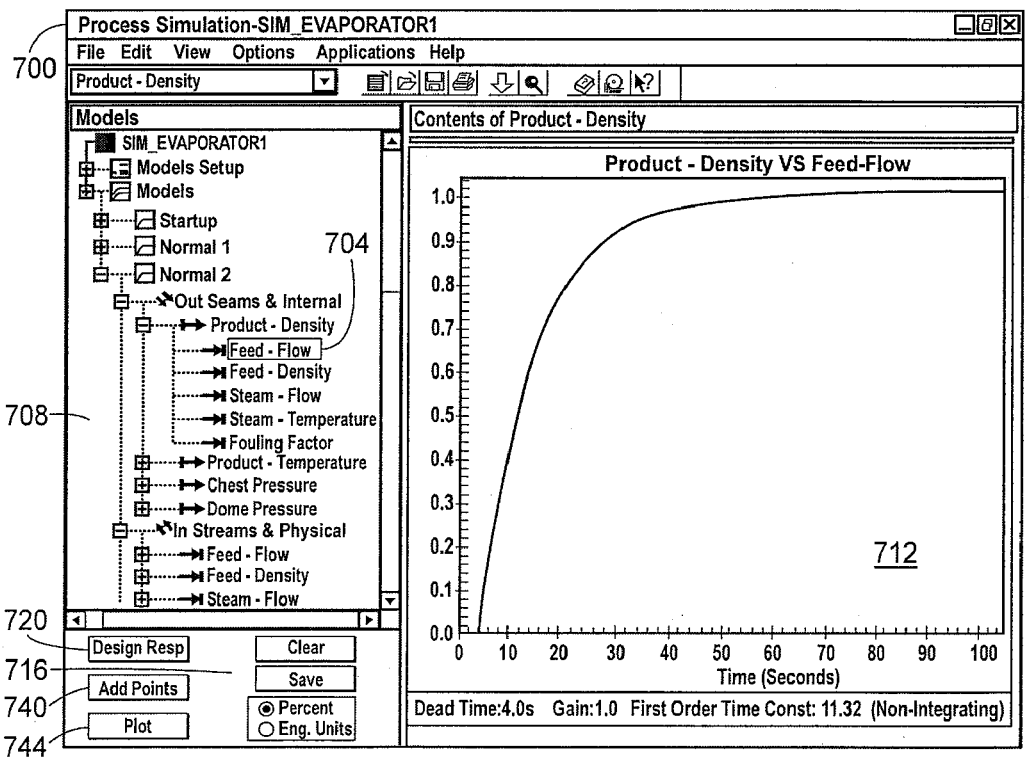
FIG. 20 is an example display for viewing and editing a step response.

Referring to FIG. 19, more information regarding a model may be viewed. For example, the example display 670 includes a portion 674 that displays different models in a hierarchy view. A model 678 has been selected and step responses associated with different properties/parameters are displayed in the portion 682. Referring now to FIG. 20, by selecting a property/parameter associated with a model, more details regarding that property/parameter may be displayed. In the example display 700, a parameter 704 has been selected in the portion 708. The associated step response is shown in more detail in the informational portion 712.

Figure 21:
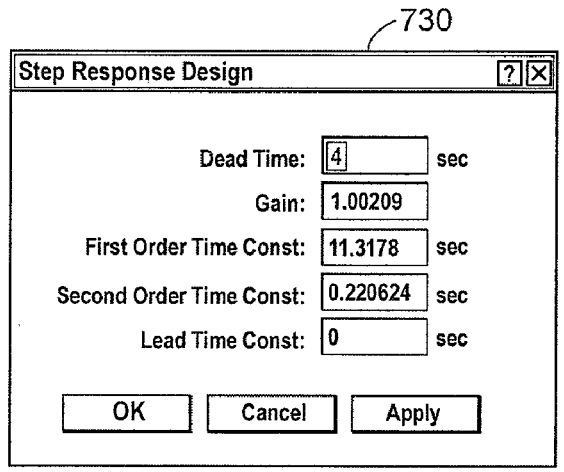
FIG. 21 an example display for modifying parameters of a model such as gain, dead time, first order time constraint, second order time constraint, and lead time constraint.

A portion 716 of the display 700 may allow a user to modify the response. For example, if a user selects a button 720, a display such as the example display 730 of FIG. 21 may be displayed to the user. The display 730 may permit a user to modify parameters of the model such as gain, dead time, first order time constraint, second order time constraint, lead time constraint, etc. Referring again to FIG. 20, the user could utilize the buttons 740 and 744 to graphically design a step response.

Figure 22:
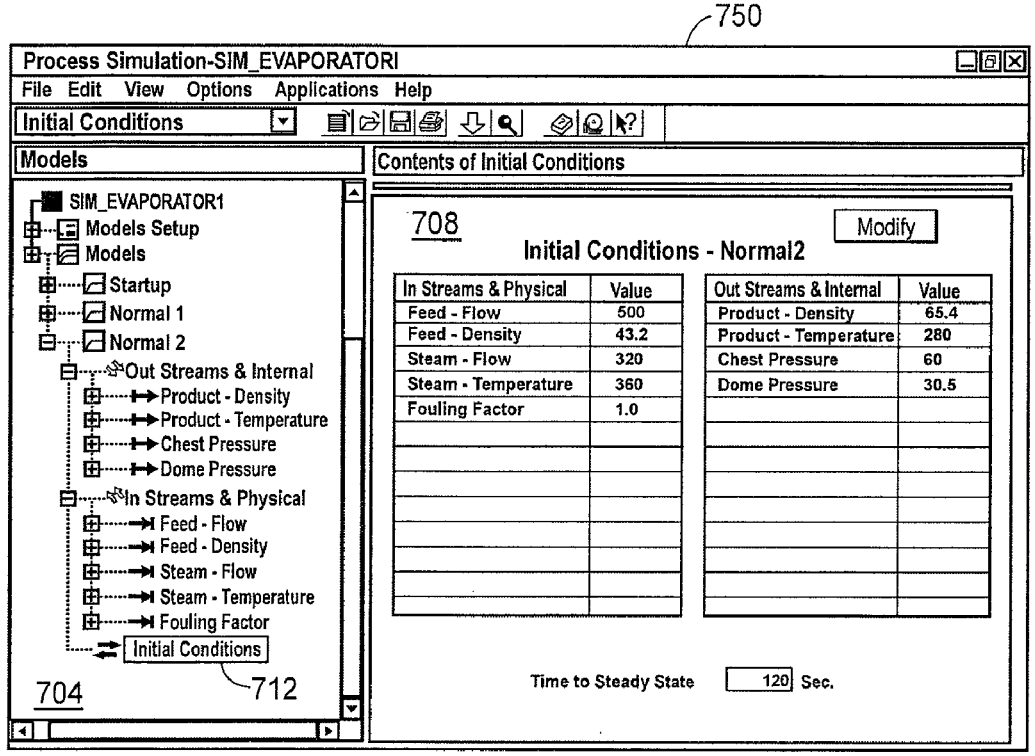
FIG. 22 is an example display that may be used to modify initial conditions and/or time to steady state of a model.

A user may also be permitted to modify initial conditions and other parameters of a model such as time to steady state. For instance, FIG. 22 is an example display 750 that may be used to modify initial conditions and/or time to steady state of a model. The display 750 includes a navigational portion 754 and an informational portion 758. When a user selects an initial conditions indicator 712, information regarding initial conditions and/or time to steady state is displayed in the informational portion 708. A user can then modify various initial conditions and/or the time to steady state via the informational portion 708. For example, the user could select a value corresponding to a particular initial condition or time to steady state, and then modify the value or enter a new value.

Instead of creating a model as described above, a model could also be created using another software tool. Then, the model could be imported. For example, a representation of a created model such as finite impulse response (FIR) model could be stored in a defined format in a text file. Then, the model could be imported using the text file. The defined format could specify, for example, that input and output stream names and the names of internal parameters should match the stream and parameter definitions of the process object with which the model corresponds.

A process module editor may also allow a user to create new process objects. Such process objects may be capable of utilizing one or more types of models to simulate behavior of a process plant entity. For example, a user may be able to select from one or more types of models such as step response models and first principal models. As just one example, a model may be created using a programming language such as C, C++, C#, visual BASIC, etc.

Referring again to FIG. 14, a user may choose to create a new process object by, for example, selecting "new" from the "File" menu in the display 450, or by selecting an icon in a toolbar corresponding to the "new" selection in the "File" menu. Then, a display such as the example display 780 of FIG. 23 may be displayed to the user. The display 780 may permit the user to select whether to create a new process module, a new process object, etc., via a user interface mechanism such as the pull-down menu 784. If the user chooses to create a new process object, the display 780 may permit the user to select whether to start from an existing process object via a user interface mechanism such as the button 786. Also, the display 780 may permit the user to select a type of model to be utilized by the new process object via a user interface mechanism such as the pull-down menu 788. In the example display 780, a user may select from a step response model or a first principal model. A first principal model may be specified using a programming language such as C, C++, C#, visual BASIC, etc.

Figure 24:
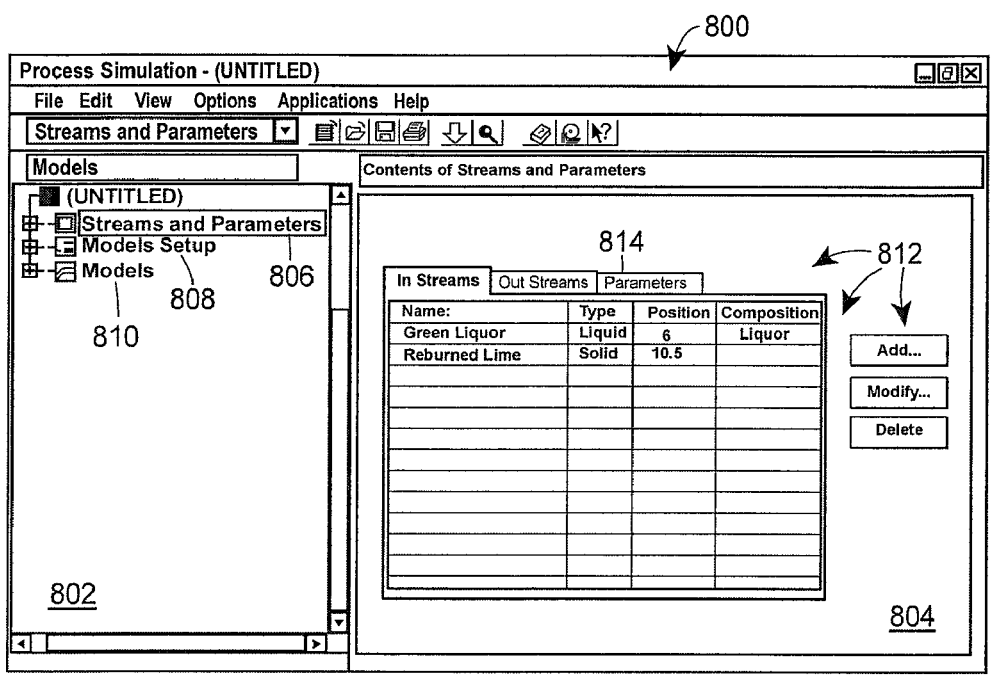
FIG. 24 is an example display for viewing and/or editing model-related parameters of a process object.

If a step response model is selected, a display such as the example display 800 of FIG. 24 may be displayed to the user. The display 800 includes a navigational portion 802 and an informational portion 804. The navigational portion 802 may include a plurality of indicators corresponding to different aspects of the process block that can be defined. For example, the navigational portion 802 may include an indicator 806 of streams and parameters, a model setup indicator 808, and a models indicator 810. If a user selects the streams and parameters indicator 806, the informational portion may include user interface mechanisms 812 that permit a user to define input streams, output streams, parameters, etc. For example, for input and output streams, a user may be permitted to define a name of a stream, the type of the stream (e.g., liquid, solid, or gas), the position, the composition, etc.

Figure 25:
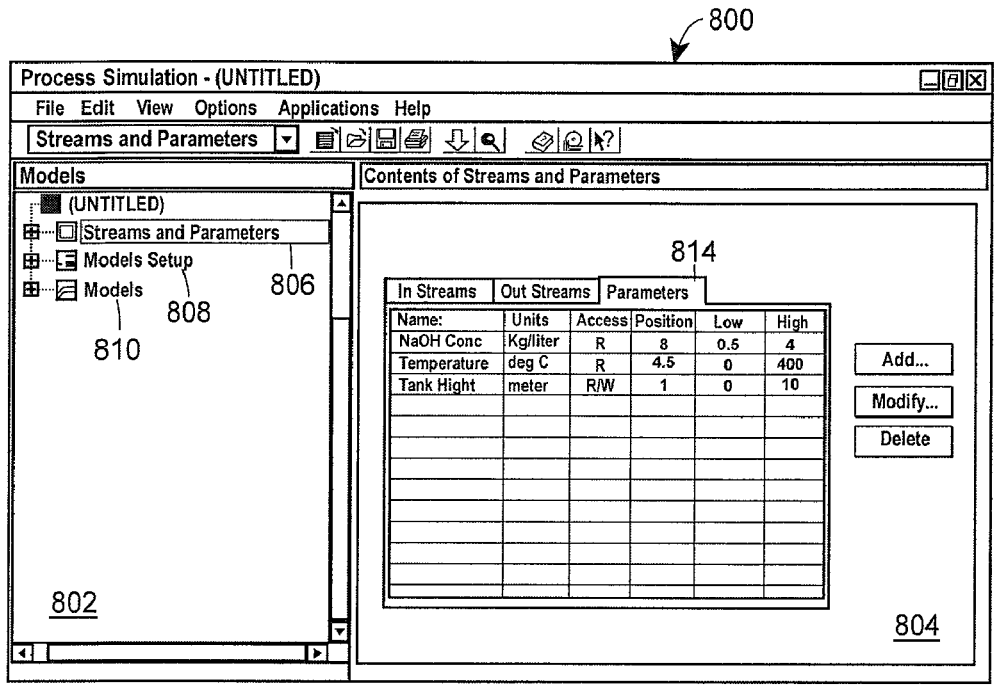
FIG. 25 is the example display of FIG. 24 in which a "streams and parameters" folder in a left-hand portion has been selected.

Referring now to FIG. 25, if a user selects the tab 814, the informational portion 804 may be changed to allow the user to add or modify parameters of the process object that are to be visible to a user. The user may be permitted to define one or more (or none) of a name of a parameter, units of the parameter, access (read only, read/write, etc.), low and/or high limits of the parameter, position, etc., for example.

Figure 26:
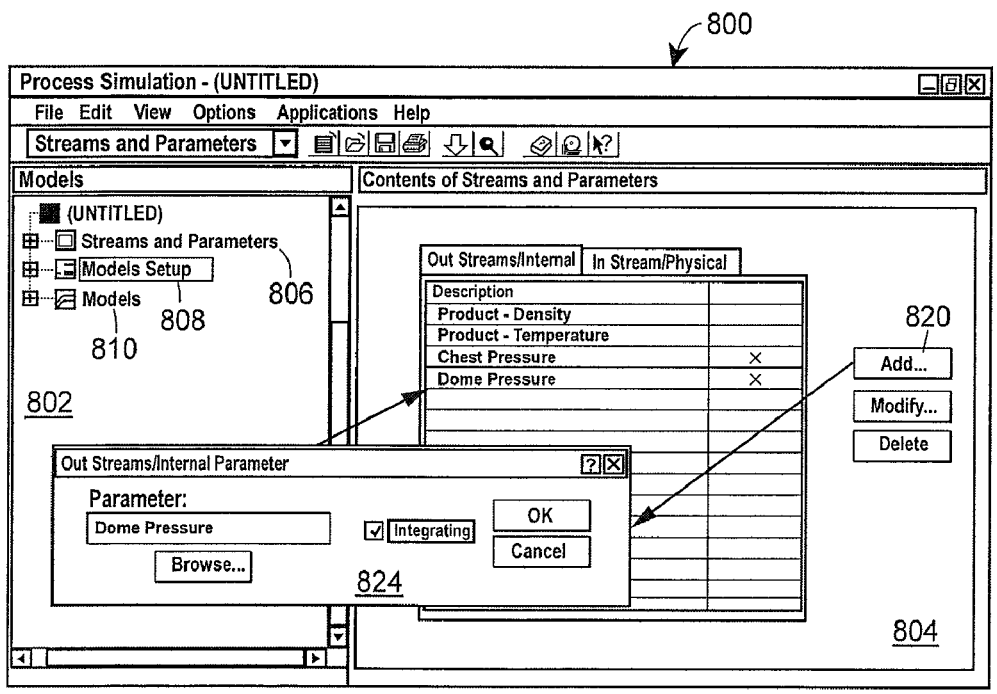
FIG. 26 illustrates the example display of FIG. 24 in which a user has selected to add a parameter to be utilized by a step response model.

A user may also be able to specify attributes of input and output streams and parameters to be utilized by the step response model. Referring to FIG. 26, if the user selects the model setup indicator 808, the informational portion may be modified to allow a user to specify attributes of input and output streams and parameters to be utilized by the step response model. For example, if the user selects the "add" button 820, a display 824 may be displayed to allow the user to add a parameter and to specify whether the parameter is to have an integrated response.

Figure 27:
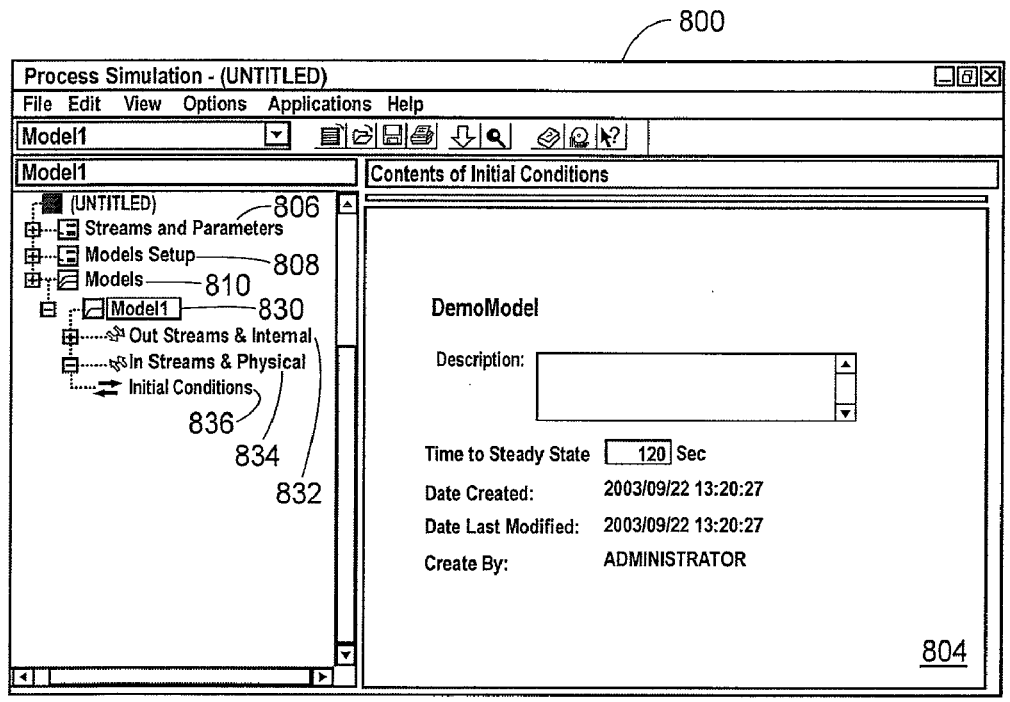
FIG. 27 illustrates the example display of FIG. 24 in which it permits a user to add information regarding a new model such as a textual description of the new model.

Additionally, a user may define step response models. For example, if a user selects (e.g., "right clicks") the model indicator 810 in the display portion 802, a menu including a "New" selection may be displayed. Referring now to FIG. 27, if the user selects "New" from the menu, a model indicator 830 with a default name may be added under the model indicator 810 in the display portion 802. Additionally, indicators 832, 834, and 836 corresponding to the model may be added as well in the display portion 802. Further, the informational portion 804 may be modified to allow a user to add information regarding the model such as a textual description and a time to steady state parameter, for example. Models and initial conditions may be specified in a manner similar to that described above with respect to FIGS. 20-22, for example.

Figure 23:
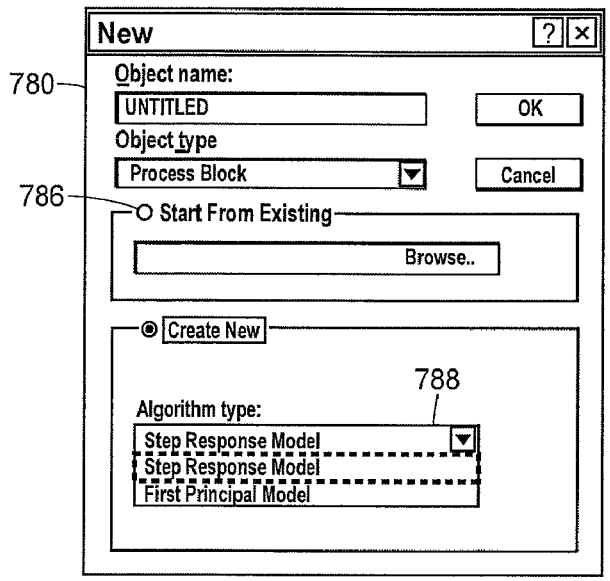
FIG. 23 is an example display for selecting a type of model to be utilized by a process object.
Figure 28:
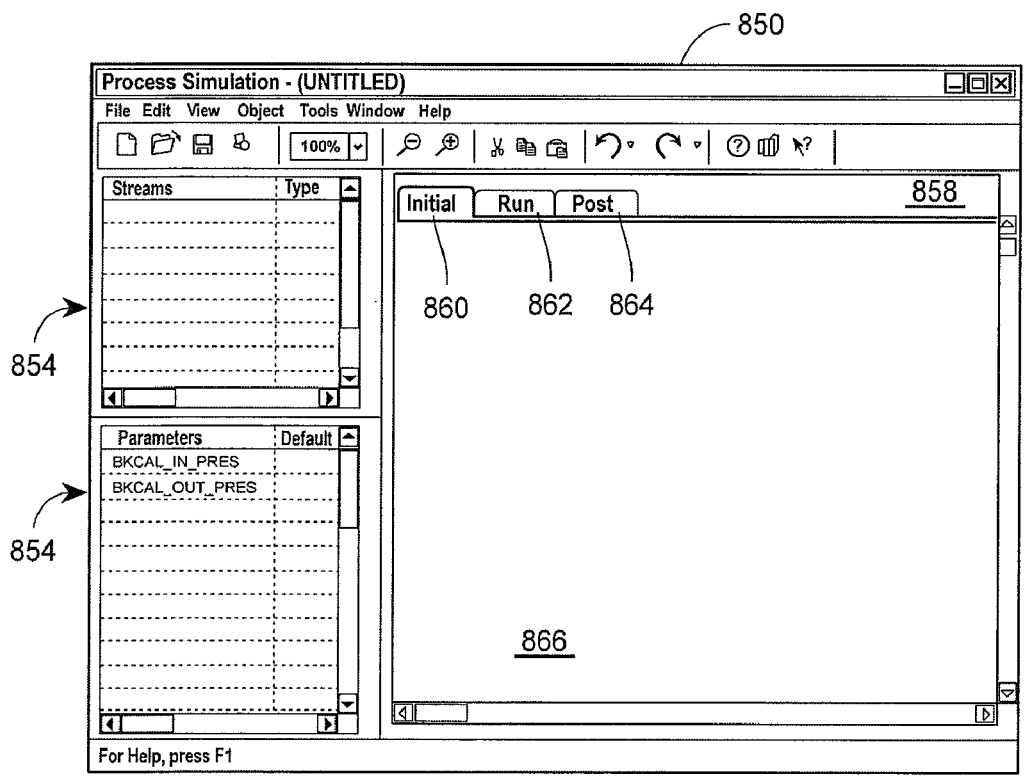
FIG. 28 is an example display for specifying a first principals model to be utilized by a process object.

Referring now to FIGS. 23 and 28, if a user selects a first principals model to be utilized by the new process object, for example via the display 780, a process object editor may be provided to the user utilizing a display such as an example display 850. The display 850 may include a portion 854 for displaying indications of input and output streams and a portion 856 for displaying indications of parameters. Some parameters may be standard for all process objects and may thus be initially shown in the portion 856. The display 850 also may include a portion 858 for specifying algorithms for simulation. The portion 858 may include tabs 860, 862, and 864 for selecting different algorithms for different modes of operation (e.g., initial, run, post, etc.). A user may type in algorithms in a programming language such as C, C++, C#, etc., for example, in the portion 866.

Figure 29:
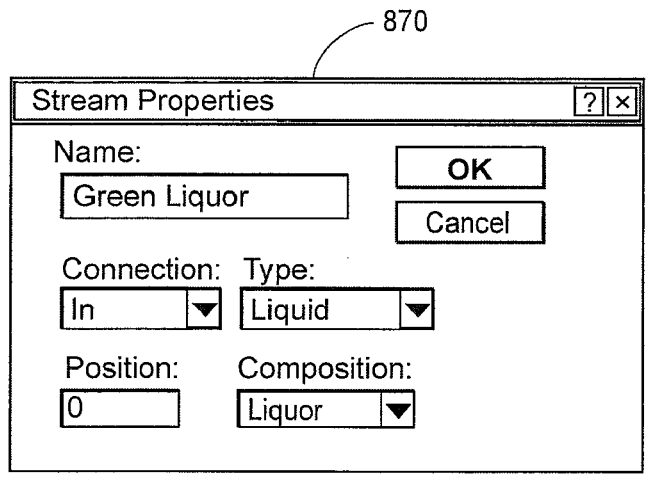
FIG. 29 is an example display for adding or modifying properties of a stream element.

Additionally, a user may be able to add streams and/or parameters in creating a process object. For example, by right clicking in the portion 854, the user may be provided with a menu having a "New" selection. If the user selects the "New" selection, a display such as the example display 870 of FIG. 29 may be displayed to the user. Using the display 870, a user may be able to define a name, a connection use (e.g., IN or OUT), a position, a stream type (e.g., liquid, solid or gas), and/or an associated composition, if any, for example. Similarly, a user could modify an existing stream by right clicking on the stream and then choosing a "Modify" element from a menu displayed in response to the right click. A display similar to the display 870 could then be used to modify the stream.

Figure 30:
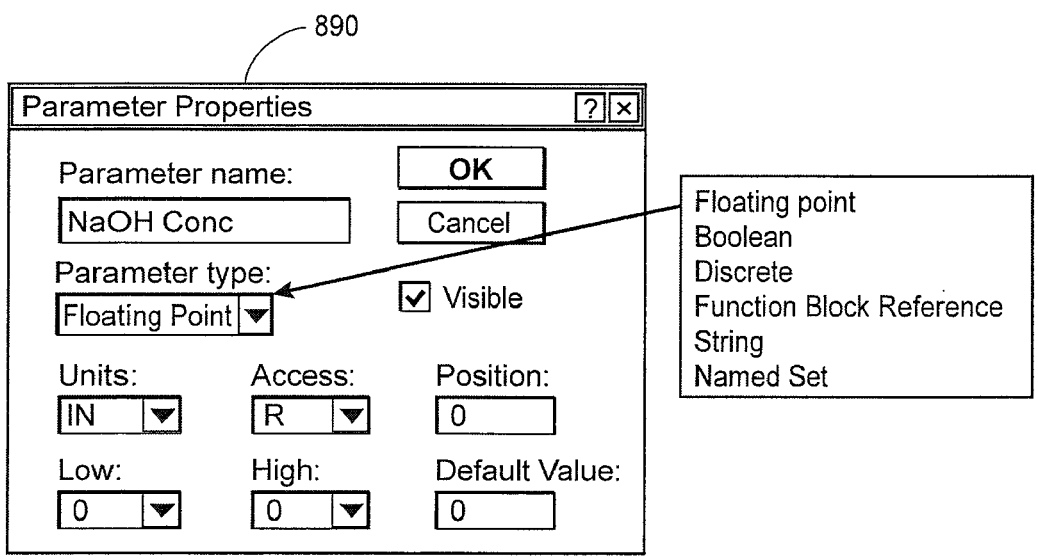
FIG. 30 is an example display for adding or modifying properties of a parameter.

Referring again to FIG. 28, as another example, by right clicking in the portion 856, the user may be provided with a menu having a "New" selection. If the user selects the "New" selection, a display such as the example display 890 of FIG. 30 may be displayed to the user. Using the display 890, a user may be able to define a name, a parameter type (e.g., floating point, Boolean, discrete, function block reference, string, named set, etc.) units, access (e.g., read only, read/write, etc.), position, low and high limit values, a default value, whether the parameter is to be visible to users, etc. Similarly, a user could modify an existing parameter by right clicking on the parameter and then choosing a "Modify" element from a menu displayed in response to the right click. A display similar to the display 890 could then be used to modify the parameter.

Different fields could be displayed in a display such as the display 890 depending on the specified parameter type. For example, if the parameter type is selected as Function Block Reference, then the name of the reference and the type of block(s) that may be referenced (e.g., input, output, specific block such as AI, DI, PCI, AO, DO, DV, etc.) may be displayed.

As one of ordinary skill in the art will recognize, a process module may be capable of utilizing a plurality of types of models to help simulate the process. For example, one process object in the process module may utilize a step response model, whereas another process object in the process module may utilize a first principals model. Further, a user may choose not to utilize any models in connection with a process object or even a process module. In another implementation, at least one process object may be capable of utilizing a plurality of different types of models. For example, one parameter of the process object may utilize a step response model, whereas another parameter may utilize a first principals model.

Stream elements may be used to define starting and ending point of a simulation implemented by a module. Types of stream elements that may be used include a stream element in which user defined property values are used in the simulation, a stream element in which properties determined by the upstream block are reflected as the stream property values, a stream element in which the path configured for this stream is used to read the property values of an external output stream and are used as the stream property values, a stream element in which the property values passed by the upstream block to the stream element are written to an external input stream using the configured path, etc. Stream parameters that may be accessed and configured may vary with the stream type.

A stream element in which user defined property values are used in the simulation may be used to define the starting point in a process simulation, for example. When an input stream is added to a process module, it may, by default, take on a default connection type selected for the module. By clicking on the stream in a workspace portion of a display, output property values and configurable parameters associated with the stream may be shown in a portion of display separate from the workspace portion.

Figure 31:
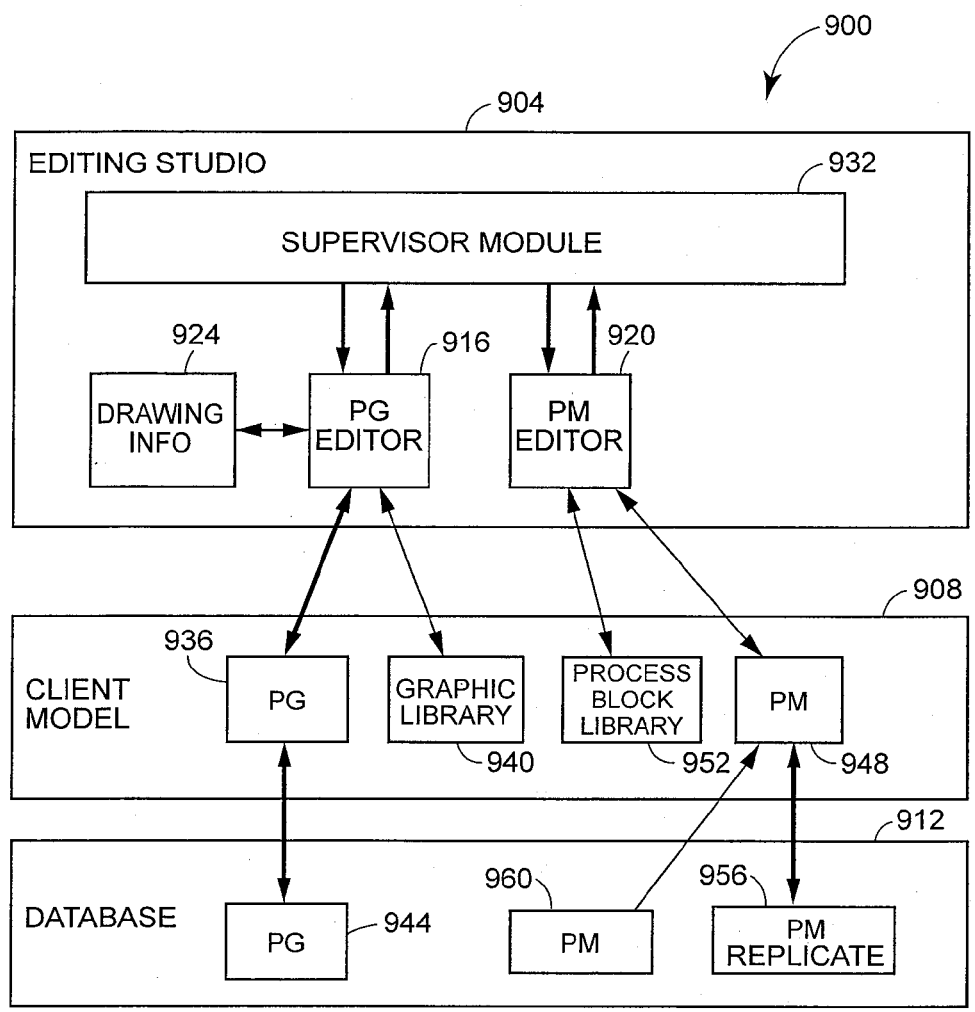
FIG. 31 is a block diagram of an example system that may be used to automatically generate a process module from a corresponding process graphic, and/or vice versa.

As described above, a user may be able to create a graphic display and then automatically generate a corresponding process module from that display, and/or vice versa. FIG. 31 is a block diagram of an example system 900 that may be used to automatically generate a process module from a corresponding process graphic, and/or vice versa. The system 900 includes an editing studio 904 to facilitate editing of process graphics and process modules, a client model 908 to store process graphics and process modules being edited, and a database 912. At least some of the system 900 may be implemented via software, for example.

The editing studio 904 and the client model 908 can be implemented by one or more computing systems such as workstations, servers, etc. Referring to FIG. 1, the editing studio 904 and/or the client model 908 could be implemented, at least partially, by the operating workstation 20 and/or the operating workstation 22, for example. For instance, the editing studio 904 and/or the client model 908 could be implemented solely by the operating workstation 20 or solely by the workstation 22. In another implementation, the editing studio 904 and/or the client model 908 could be implemented by the operating workstation 20 in conjunction with another computing system, where the workstation 20 operates as a client and the other computing system operates as a server in a client-server arrangement. The configuration database 28 could include the database 912, for example.

The editing studio 904 may include a process graphics editor 916 to facilitate editing of process graphics, and a process module editor 920 to facilitate editing process modules. The process graphics editor 916 may interface with drawing information 924 such as instructions regarding how elements should be drawn (e.g., weight of lines, colors, shading, etc.). The process graphics editor 916 may generate user interface displays such as the display 64 of FIG. 3, for example. The process module editor 920 may interface with the client model 908. The process graphics editor 916 may generate user interface displays such as the display 450 of FIG. 14, for example.

The editing studio 904 may also include a supervisor module 932 to coordinate editing actions taken in the process graphics editor 916 and the process module editor 920. For example, the process graphics editor 916 may notify the supervisor module 932 of editing actions taken by a user in editing or creating a process graphic. The supervisor module 932 may then issue instructions to the process module editor 920 to take corresponding actions regarding a process module associated with the process graphic. As another example, the process module editor 920 may notify the supervisor module 932 of editing actions taken by a user in editing or creating a process module. The supervisor module 932 may then issue instructions to the process graphics editor 916 to take corresponding actions regarding a process graphic associated with the process module. In such a manner, the system 900 may facilitate automatic creating or editing of a process module based on the creation or edition of a process graphic.

A few example scenarios will be described to illustrate operation of the system 900. In one scenario, a user adds to a process graphic a graphic block corresponding to an actuator using the process graphics editor 916. The process graphics editor 916 may then notify the supervisor module 932 that the actuator block has been added to the process graphic. The supervisor module 932 may then instruct the process module editor 920 to add a process block corresponding to the actuator to a process module corresponding to the process graphic. In a similar scenario, a user adds to a process module a process object corresponding to a pump using the process module editor 920. The process module editor 920 may then notify the supervisor module 932 that the pump object has been added to the process module. The supervisor module 932 may then instruct the process graphics editor 916 to add a graphics block corresponding to the pump to a process graphic corresponding to the process module.

In another scenario, a user deletes a graphic block from a process graphic using the process graphics editor 916. The process graphics editor 916 may then notify the supervisor module 932 that the graphic block has been deleted from the process graphic. The supervisor module 932 may then instruct the process module editor 920 to delete a process block corresponding to the process graphic from a process module corresponding to the process graphic. In a similar scenario, a user deletes a process object from a process module using the process module editor 920. The process module editor 920 may then notify the supervisor module 932 that the process graphic has been deleted from the process module. The supervisor module 932 may then instruct the process graphics editor 916 to delete a graphics block corresponding to the pump from a process graphic corresponding to the process module.

The client model 908 may be created by the editing studio 904, and may include a client model process graphic 936 and a graphic library 940. The process graphics editor 916 may operate on the client model process graphic 936 and may utilize graphic blocks provided in the graphic library 940. The client model process graphic 936 may be initially created based on a database process graphic 944 in the database 912. Subsequently, the client model 908 may update the database process graphic 944 in the database 912 to reflect changes made in the client model process graphic 936. Such updates may occur, for example, in response to a change in the client model process graphic 936, in response to a user request, periodically, when the user indicates completion of editing or of creating a process graphic or process module, etc.

The client model 908 may also include a client model process module 948 and a process block library 952. The process module editor 920 may operate on the client model process module 948 and may utilize process blocks provided in the process block library 952. The client model process module 948 may be initially created based on a process module replicate 956 or a database process module 960 in the database 912. For example, the process module replicate 956 initially could be created base on the database process module 960. Subsequently, the client model 908 may update a process module replicate 956 in the database 912 to reflect changes made in the client model process module 948. Such updates may occur, for example, in response to a change in the client model process module 948, in response to a user request, periodically, when the user indicates completion of editing or of creating a process graphic or process module, etc. When a user indicates completion of editing or of creating a process graphic or process module, for example, the process module replicate 956 may be used to update the database process module 960.

In operation, a user may utilize the process graphics editor 916 to edit or create a process graphic, for example. Changes that the user makes to the process graphic may be stored as the client model process graphic 936. Also, changes to the client model process graphic 936 may then be propagated to the database process graphic 944 as described above. Additionally, changes that the user makes to the process graphic may be reflected in a process module corresponding to the process graphic. Namely, the process graphics editor 916 may send to the supervisor module 932 indications of changes to the process graphic. Then, the supervisor module 932 may send instructions to the process module editor 920 to make corresponding changes to the corresponding module. Changes to the process module may be stored as the client model process module 948. Also, changes to the client model process module 948 may then be propagated to the process module replicate 956 and the database process graphic 944 as described above.

Similarly, a user may utilize the process module editor 920 to edit or create a process module, for example. Changes that the user makes to the process module may be stored as the client model process module 948. Also, changes to the client model process module 948 may then be propagated to the process module replicate 956 and the database process graphic 944 as described above. Additionally, changes that the user makes to the process module may be reflected in a process graphic corresponding to the process module. Namely, the process module editor 920 may send to the supervisor module 932 indications of changes to the process module. Then, the supervisor module 932 may send instructions to the process graphics editor 916 to make corresponding changes to the corresponding graphic. Changes to the process graphic may be stored as the client model process graphic 936. Also, changes to the client model process graphic 936 may then be propagated to the database process graphic 944 as described above.

With regard to the supervisor module 932, it generally may receive indications of changes to a process graphic from the process graphics editor 916. Then, the supervisor module 932 may determine what changes to the process module correspond to these changes to the process graphic. Next, the supervisor module 932 may issue instructions to the process module editor 920. For some changes to a process graphic, the supervisor module 932 may determine there are no corresponding changes to the corresponding process module. For example, a change of color of a graphic element in the process graphic may not have a corresponding change in the process module.

The supervisor module 932 may determine what change to the process module corresponds to a change to the process graphic when it receives an indication of the change to the process graphic. Also, the supervisor module 932 may determine changes to the process module corresponding to changes to the process graphic periodically, when a certain number of indications of changes to the process graphic have been received, when the user indicates that it would like changes propagated to the process module, when the user indicates that editing or creation of the process graphic is complete, etc. Similarly, the supervisor module 932 may issue instructions to the process module editor 920 shortly after it receives an indication of the change to the process graphic or shortly after the supervisor module 932 determines the instructions. Also, the supervisor module 932 may issue instructions to the process module editor 920 periodically, when a certain number of indications of changes to the process graphic have been received, when a certain number of instructions have been determined, when the user indicates that it would like changes propagated to the process module, when the user indicates that editing or creation of the process graphic is complete, etc.

Similarly, the supervisor module 932 generally may receive indications of changes to a process module from the process module editor 920. Then, the supervisor module 932 may determine what changes to the process graphic correspond to these changes to the process module. Next, the supervisor module 932 may issue instructions to the process graphics editor 916. For some changes to a process module, the supervisor module 932 may determine there are no corresponding changes to the corresponding process graphic.

In some cases, the system 900 may not be able to complete automatically a configuration of a process module based on a process graphic. In such cases, a user can utilize the process module editor 920 to complete the configuration of the process module. For example, as described above with reference to FIGS. 7A and 7B, control modules may be integrated with process modules and/or process graphics. The system 900 may not be able to determine automatically an integration of a control module with the process module based on the process graphic. Thus, a user could utilize the process module editor 920 or some other tool to help complete the configuration.

Figure 32:
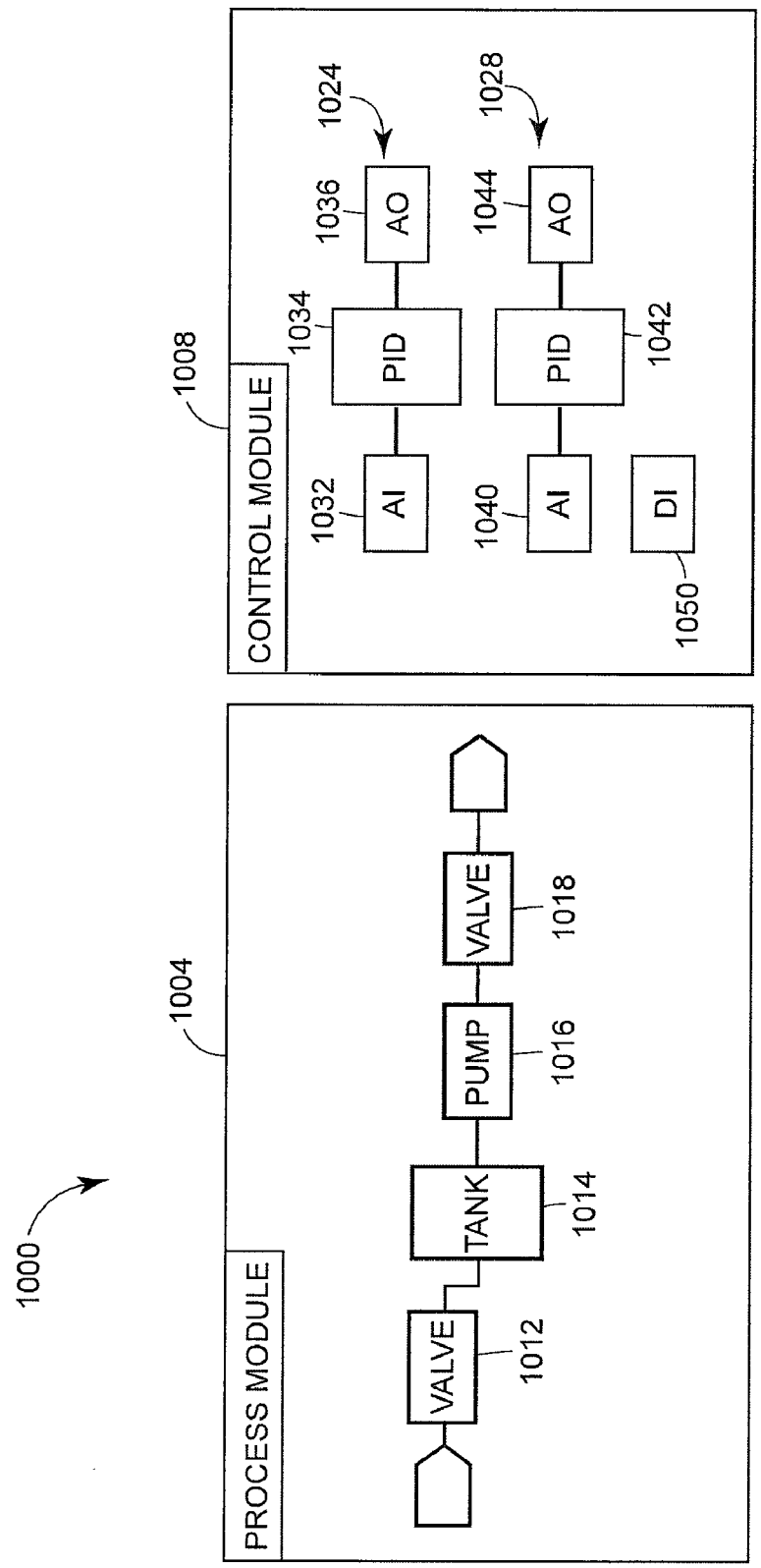
FIG. 32 is an example display that may be used to help configure a process module.

FIG. 32 is an example display 1000 that may be used to help configure a process module. The example display 1000 may be generated by the configuration applications 38 of FIG. 1, for example. As shown in FIG. 32, a process module portion 1004 depicting a process module could be displayed proximate to a control module portion 1008 depicting a control module associated with the process module. The process module portion 1004 includes a valve block 1012, a tank block 1014, a pump block 1016, and a valve block 1018. An output of the valve block 1012 is connected to an input of the tank block 1014, and an input of the pump block 1016 is connected to an output of the tank block 1014. An output of the pump block 1016 is connected to an input of the valve block 1018. An input of the valve block 1012 and an output of the valve block 1018 are connected to stream elements (not labeled). The valve block 1012, the tank block 1014, the pump block 1016, and the valve block 1018 are connected in series via piping elements (not labeled).

The control module portion 1008 may correspond to a control module that controls at least some of the physical elements associated with the blocks in the process module portion 1004. The control module portion 1008 includes a set of interconnected function blocks that provide control within or associated with the elements depicted in the process module portion 1004. The control module includes a first control loop 1024 and a second control loop 1028. The first control loop 1024 includes an AI function block 1032 that is to receive flow input information about the flow of fluid into the tank 1014, a PID control function block 1034 that is to perform PID control, and an AO function block 1036 that is to operate the valve 1012 to effect the desired flow of material into the tank 1014. In a similar manner, the control loop 1028 includes an AI function block 1040 that is to provide tank level information as measured by a level sensor within the tank 1014, a PID control block 1042 and an AO function block 1044 that receives a control signal from the PID control block to operate the valve 1018 to effect control of the level of fluid within the tank 1014. The control module depicted in the portion 1008 also includes a DI function block 1050 that is to indicate, for example, the on/off state or operation of the pump 1016 and which may be used by the control loops 1024 and 1028 if so desired to perform control activities with respect to the tank 1014.

To integrate the process module depicted in the display 1004 and the control module depicted in the display 1008, the user may utilize the display 1000 by graphically selecting an element in the process module portion 1004 and an associated element in the control module portion 1008. For example, a user could select with a mouse, stylus, touch screen, etc., for example, an element in the control module portion 1008 that the user would like to link to an element in the process module portion 1004. After having selected an element in the control module portion 1008, the user could then select, e.g., by "right clicking," "double clicking," etc., for example, an element in the process module portion 1004 that is to be associated with the selected element in the control module portion 1008. If an element has several parameters with which a control module element could be associated, the user could be prompted, using a pop-up window, menu, check box, etc., to select one of the parameters. For instance, the user could first select the AO block 1036. Then, the user could double click on the valve 1012. In this way, the user can specify that the AO function block 1036 operates the valve 1012 to affect the desired flow of material into the tank 1014.

Similarly, the user could graphically select the AI function block 1032 in the control module portion 1008, and then select the tank block 1014 in the process module portion 1004. Because the tank block 1014 may have several parameters associated with it (e.g., flow into tank, tank level, etc.), the user could be prompted to choose one of the tank parameters in response to selecting the tank block 1014. For example, the user could be prompted to choose between an input flow parameter or a tank level parameter via a pop-up window, a menu, check boxes, etc. The user could then choose the input flow parameter.

Although in the above-described examples a user first chooses an element in a control module portion and then chooses an associated element in a process module portion, a user could first choose an element in a process module portion and then choose an associated element in a control module portion.

As another example, the user could be presented with views of the control module depicted in the control module portion 1008 and the process module depicted in the process module portion 1004, in which elements of the control module and the process module are depicted but their interconnections are not depicted. For example, a view of the process module could be a hierarchical view in which the valve 1012, the tank 1014, the pump 1016, and the valve 1018 are illustrated as being elements of the process module. Similarly, a view of the control module 1008 could be a hierarchical view in which the control loop 1024, the control loop 1028, and the DI function block are illustrated as being elements of the control module. The AI function block 1032, the PD function block 1034, and the AO function block 1036 may be illustrated as being elements of the control loop 1024, and the AI function block 1040, the PID function block 1042, and the AO function block 1044 may be illustrated as being elements of the control loop 1028. The user could then graphically select an element in the hierarchical view of the process module and an associated element in the hierarchical view of the control module in a manner similar to that described above.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A user interface method for facilitating configuration of a process plant, the method performed by a computer processor executing a set of instructions stored on a computer-readable medium, the method comprising:
    segmenting a display into at least a first portion, a second portion, and a third portion;
    displaying in the first portion a workspace to create a simulation algorithm for at least a portion of the process plant, at least a portion of the simulation algorithm being defined by depictions of connections among process objects in the workspace;
    displaying in the second portion a library of process objects capable of being added to the workspace, at least one of the process objects in the library having at least one associated graphical representation of a physical entity in the process plant corresponding to the process object, wherein the process object having the associated graphical representation of the physical entity includes simulation functionality that is based on behavior of the physical entity; and
    if a process object in the workspace is selected by a user, displaying in the third portion indications of parameters of the selected process object.

2. A method according to claim 1, wherein the one process object comprises at least one of a stream object, a connection object, an actuator object, a standard process object, a custom process object, or a user defined process object.

3. A method according to claim 1, further comprising: if one of the indications of parameters is selected by the user, providing a display to enable the user to modify a parameter corresponding to the one indication.

4. A method according to claim 1, further comprising:
    if the user indicates that a new parameter corresponding to the one process object is to be added, providing a display to enable the user to add the new parameter; and
    displaying in the third portion an indication of the new parameter.

5. A method according to claim 1, further comprising automatically generating at least some of the depictions of connections among process objects in the workspace based on a process graphic created using a process graphics editor, the process graphic depicting at least the portion of the process plant.

6. A method according to claim 1, further comprising prompting the user to select a model for a process object in the workspace, the model to be selected from a plurality of models, the model to simulate behavior of a physical entity in the process plant corresponding to the process object.

7. A method according to claim 6, wherein prompting the user to select the model comprises prompting the user to select the model from at least a step response model and a first principals model.

8. A method according to claim 7, wherein the process object in the workspace is capable of having a step response model associated with a first parameter of the process object and a first principals model associated with a second parameter of the process object.

9. A method according to claim 1, further comprising: if one of the indications of parameters is selected by the user, providing a display to enable the user to link a parameter corresponding to the one indication to a control module adapted to execute on one or more process controllers to implement process control activities in the process plant.

10. A method according to claim 1, further comprising: if one of the indications of parameters is selected by the user, providing a display to enable the user to link a parameter corresponding to the one indication to a control module adapted to execute on one or more process controllers to implement process control activities in the process plant.

11. A system for facilitating configuration of a process plant, the system comprising:
a process graphics editor to facilitate creation or modification of a graphical representation of physical entities in the process plant, the graphical representation adapted to be displayed on a display device;
a process module editor to facilitate creation or modification of a process module, the process module including one or more interconnected process objects representative of one or more corresponding physical entities in the process plant, at least one of the process objects including a method adapted to perform a function using parameter data to produce an output related to process operation associated with the corresponding physical entities in the process plant;
a supervisor module communicatively coupled to the process graphics editor and the process module editor, the supervisor module to detect a change made to the graphical representation of the physical entities in the process plant using the process graphics editor and to instruct the process module editor to make a corresponding change, if any, to the process module;
wherein each of the process graphics editor, the process module editor, and the supervisor module further comprises a set of computer-readable instructions stored on a computer-readable medium.

12. A system according to claim 11, wherein the supervisor module is adapted to detect a change made to the process module using the process module editor and to instruct the process graphics editor to make a corresponding change, if any, to the graphical representation of the physical entities in the process plant.

13. A system according to claim 12, wherein at least some changes made to the process module using the process module editor have no corresponding change to the graphical representation of the physical entities in the process plant.

14. A system according to claim 11, wherein at least some changes made to the graphical representation of the physical entities in the process plant using the process graphics editor have no corresponding change to the process module.

15. A system according to claim 11, wherein the process graphics editor is adapted to cause the graphical representation to be stored in a database;
wherein the process module editor is adapted to store the process module in the database separate from the graphical representation.

16. A system according to claim 11, further comprising a computer readable memory;
wherein the process graphics editor is an application stored on the computer readable memory and is adapted to be executed on a processor to facilitate creation or modification of the graphical representation of physical entities in the process plant;
wherein the process module editor is an application stored on the computer readable memory and is adapted to be executed on the processor to facilitate creation or modification of the process module;
wherein the supervisor module is an application stored on the computer readable memory and is adapted to be executed on the processor to detect the change made to the graphical representation of the physical entities in the process plant and to instruct the process module editor to make the corresponding change, if any, to the process module.

17. A system according to claim 11, wherein the process module editor is adapted to permit a user to select a model for a process object from a plurality of models, the model to simulate behavior of a physical entity in the process plant corresponding to the process object.

18. A system according to claim 17, wherein the process module editor is adapted to permit a user to select at least one of a step response model and a first principals model for the process object.

19. A system according to claim 17, wherein if a connection between a first process object and a second process object in the process module is created, one of the first process object and the second process object is capable of passing to the other of the first process object and the second process object at least one of a connection status, a mass flow parameter, a pressure parameter, a temperature parameter, a specific heat parameter, a density parameter, a flow not possible parameter, a pressure basis for pressure/flow network parameter, or a flow basis for pressure/flow network parameter.

20. A method for facilitating configuration of a process plant, the method comprising:
detecting, using a supervisor module application being executed by a first processor, a change to a graphical representation of physical entities in the process plant, the graphical representation adapted to be displayed on a display device, the change to the graphical representation of physical entities in the process plant made using a process graphics editor communicatively coupled to the supervisor module application;
determining, using the supervisor module application, a corresponding change, if any, to be made to a process module corresponding to the graphical representation of physical entities in the process plant, the process module comprising one or more interconnected process objects representative of the physical entities in the process plant; and
if the corresponding change to be made to the process module is determined, instructing, using the supervisor module application, a process module editor communicatively coupled to the supervisor module application to modify the process module according to the determined change to be made to the process module;
wherein each of the supervisor module application, the graphics editor, and the process module editor further comprises a set of computer-readable instructions stored on a computer-readable medium.

21. A method according to claim 20, the method further comprising:

detecting, using the supervisor module, a change to the process module, the change to the process module made using the process module editor;

determining, using the supervisor module application, a corresponding change, if any, to be made to the graphical representation of physical entities in the process plant corresponding to the detected change to the process module; and if the corresponding change to be made to the graphical representation of physical entities in the process plant is determined, instructing, using the supervisor module application, the process graphics editor to modify the graphical representation of physical entities in the process plant according to the determined change to be made to the graphical representation of physical entities in the process plant.

22. A method according to claim 20, wherein the process graphics editor and the process module editor are applications executed by the first processor.

23. A method according to claim 20, wherein at least one of the process graphics editor or the process module editor is an application executed by a second processor.

24. A method according to claim 20, wherein at least one of the one or more interconnected process objects comprises at least one of a stream object, a connection object, an actuator object, a standard process object, a custom process object, or a user defined process object.

25. A method according to claim 20, wherein at least one of the one or more interconnected process objects includes a method adapted to perform a function using parameter data to produce an output related to process operation associated with the physical entities in the process plant.

26. A method according to claim 20, the method further comprising:

copying a version of the graphical representation of physical entities in the process plant, if any, from a database to a computing system separate from the database and communicatively coupled to the database; and copying a version of the process module, if any, from the database to the computing system.

* * * * *

UNITED STATES PATENT AND TRADEMARK OFFICE
CERTIFICATE OF CORRECTION

| | | |
|---|---|---|
| PATENT NO. | : 7,783,370 B2 | Page 1 of 1 |
| APPLICATION NO. | : 10/575022 | |
| DATED | : August 24, 2010 | |
| INVENTOR(S) | : Mark J. Nixon et al. | |

It is certified that error appears in the above-identified patent and that said Letters Patent is hereby corrected as shown below:

In the Specification:

At Column 6, line 67, "And" should be -- and --.

At Column 18, line 48, "spay" should be -- spray --.

At Column 21, line 58, "And" should be -- and --.

At Column 24, line 54, "pickeling" should be -- pickling --.

At Column 24, line 57, "picketing" should be -- pickling --.

At Column 32, line 10, "thereofThese" should be -- thereof. These --.

At Column 40, line 2, ",graphic" should be -- graphic --.

Signed and Sealed this

Thirty-first Day of May, 2011

David J. Kappos
*Director of the United States Patent and Trademark Office*